US012811156B2

(12) United States Patent
Kuriki et al.

(10) Patent No.: US 12,811,156 B2
(45) Date of Patent: Nov. 24, 2026

(54) SECONDARY BATTERY

(71) Applicant: SEMICONDUCTOR ENERGY LABORATORY CO., LTD., Atsugi (JP)

(72) Inventors: Kazutaka Kuriki, Ebina (JP); Teruaki Ochiai, Atsugi (JP); Yumiko Yoneda, Isehara (JP); Shunpei Yamazaki, Setagaya (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 619 days.

(21) Appl. No.: 17/782,707

(22) PCT Filed: Nov. 27, 2020

(86) PCT No.: PCT/IB2020/061201

§ 371 (c)(1),
(2) Date: Jun. 6, 2022

(87) PCT Pub. No.: WO2021/116811

PCT Pub. Date: Jun. 17, 2021

(65) Prior Publication Data

US 2023/0009782 A1 Jan. 12, 2023

(30) Foreign Application Priority Data

Dec. 10, 2019 (JP) ................................ 2019-223211

(51) Int. Cl.
*H01M 4/66* (2006.01)
*H01M 4/02* (2006.01)
(Continued)

(52) U.S. Cl.
CPC ........... *H01M 4/661* (2013.01); *H01M 4/626* (2013.01); *H01M 4/667* (2013.01);
(Continued)

(58) Field of Classification Search
CPC ...... H01M 4/661; H01M 4/626; H01M 4/667; H01M 10/0525; H01M 2004/027;
(Continued)

(56) References Cited

U.S. PATENT DOCUMENTS 6,982,132 B1 * 1/2006 Goldner ............ H01M 10/0585 29/623.5
9,431,637 B2 8/2016 Dolle et al.
(Continued)

FOREIGN PATENT DOCUMENTS

CN 102859759 A 1/2013
CN 103201893 A 7/2013
(Continued)

OTHER PUBLICATIONS

JP-2008192364-A Translation Description (Year: 2008).*
(Continued)

*Primary Examiner* — Matthew T Martin
*Assistant Examiner* — Kevin Song
(74) *Attorney, Agent, or Firm* — Fish & Richardson P.C.

(57) ABSTRACT

To provide a secondary battery in which a side reaction does not easily occur at an interface between a positive electrode active material and a solid electrolyte, an interface between the positive electrode active material and a positive electrode current collector, or the like even when charge and discharge are repeated. In one embodiment of the present invention, a buffer layer or a protective layer is provided on a current collector surface or between a current collector layer and an active material layer to prevent deterioration such as oxidation of the current collector. As the buffer layer or the protective layer, it is possible to use a titanium compound such as titanium oxide, titanium oxide in which nitrogen is substituted for part of oxygen, titanium nitride, titanium nitride in which oxygen is substituted for part of
(Continued)

nitrogen, or titanium oxynitride ($TiO_xN_y$, where 0<x<2 and 0<y<1). Titanium nitride is particularly preferable because it has high conductivity and has a high capability of inhibiting oxidation.

7 Claims, 12 Drawing Sheets

(51) Int. Cl.
*H01M 4/62* (2006.01)
*H01M 10/0525* (2010.01)

(52) U.S. Cl.
CPC .................. *H01M 10/0525* (2013.01); *H01M 2004/027* (2013.01); *H01M 2004/028* (2013.01); *H01M 2220/20* (2013.01); *H01M 2220/30* (2013.01)

(58) Field of Classification Search
CPC ....... H01M 2004/028; H01M 2220/20; H01M 2220/30; H01M 4/66; H01M 10/0585; H01M 4/13; H01M 4/366; H01M 4/62; H01M 10/04; H01M 10/052; H01M 10/0562; Y02E 60/10; Y02E 60/13; Y02P 70/50; H01G 11/06; H01G 11/28; H01G 11/68; H01G 11/70
See application file for complete search history.

(56) References Cited

U.S. PATENT DOCUMENTS

| | | | |
|---|---|---|---|
| 10,741,834 B2 | 8/2020 | Zhang et al. | |
| 11,299,810 B2 | 4/2022 | Suchsland et al. | |
| 2002/0110736 A1 | 8/2002 | Kweon et al. | |
| 2003/0104279 A1 | 6/2003 | Miyazaki et al. | |
| 2004/0142241 A1 | 7/2004 | Nagayama | |
| 2006/0263690 A1 | 11/2006 | Suhara et al. | |
| 2007/0117014 A1 | 5/2007 | Saito et al. | |
| 2008/0241693 A1 | 10/2008 | Fukuchi et al. | |
| 2009/0087362 A1 | 4/2009 | Sun et al. | |
| 2009/0104532 A1 | 4/2009 | Hosoya | |
| 2010/0086854 A1 | 4/2010 | Kumar et al. | |
| 2010/0247986 A1 | 9/2010 | Toyama. et al. | |
| 2013/0006320 A1 | 1/2013 | Hintz et al. | |
| 2013/0052534 A1 | 2/2013 | Fujiki et al. | |
| 2013/0189562 A1* | 7/2013 | Dolle .................... | H01M 4/139 29/623.5 |
| 2013/0244108 A1 | 9/2013 | Hayashi et al. | |
| 2013/0323596 A1 | 12/2013 | Morita et al. | |
| 2014/0212759 A1 | 7/2014 | Blangero et al. | |
| 2015/0008364 A1 | 1/2015 | Endo | |
| 2015/0357650 A1* | 12/2015 | Lakshmanan ....... | H01M 4/0428 427/113 |
| 2016/0006032 A1 | 1/2016 | Paulsen et al. | |
| 2016/0013478 A1 | 1/2016 | Satow et al. | |
| 2016/0156032 A1 | 6/2016 | Lee et al. | |
| 2016/0268601 A1 | 9/2016 | Paulsen et al. | |
| 2016/0276659 A1 | 9/2016 | Choi et al. | |
| 2018/0013130 A1 | 1/2018 | Ochiai et al. | |
| 2018/0145317 A1 | 5/2018 | Momma et al. | |
| 2018/0145368 A1 | 5/2018 | Ochiai et al. | |
| 2019/0245199 A1 | 8/2019 | Zeng et al. | |
| 2020/0176770 A1 | 6/2020 | Takahashi et al. | |
| 2020/0220173 A1 | 7/2020 | Jo et al. | |
| 2021/0083281 A1 | 3/2021 | Mikami et al. | |
| 2021/0313571 A1 | 10/2021 | Momma et al. | |
| 2022/0131146 A1 | 4/2022 | Saito et al. | |
| 2022/0359870 A1 | 11/2022 | Mikami et al. | |
| 2025/0105282 A1 | 3/2025 | Liu et al. | |

FOREIGN PATENT DOCUMENTS

| | | | |
|---|---|---|---|
| CN | 105074980 A | | 11/2015 |
| CN | 105655554 A | | 6/2016 |
| CN | 107482224 A | | 12/2017 |
| CN | 113140726 A | | 7/2021 |
| EP | 2770564 A | | 8/2014 |
| JP | 2000-203842 A | | 7/2000 |
| JP | 2002-216760 A | | 8/2002 |
| JP | 2004055247 A | * | 2/2004 |
| JP | 2008192364 A | * | 8/2008 |
| JP | 2010-080407 A | | 4/2010 |
| JP | 2013-519990 | | 5/2013 |
| JP | 2015-099722 A | | 5/2015 |
| JP | 2016-514346 | | 5/2016 |
| JP | 2019-102261 A | | 6/2019 |
| JP | 2019-140058 A | | 8/2019 |
| KR | 2013-0034010 A | | 4/2013 |
| WO | WO-2012/060350 | | 5/2012 |
| WO | WO-2012/128071 | | 9/2012 |
| WO | WO-2014/128208 | | 8/2014 |

OTHER PUBLICATIONS

JP-2004055247-A Translation Claims (Year: 2004).*
JP-2004055247-A Translation Description (Year: 2004).*
International Search Report (Application No. PCT/IB2020/061201), dated Mar. 2, 2021.
Written Opinion (Application No. PCT/IB2020/061201), dated Mar. 2, 2021.
Zhang.J et al., "Trace doping of multiple elements enables stable battery cycling of LiCoO2 at 4.6 V", Nature Energy, Jun. 17, 2019, vol. 4, pp. 594-603.
Hirooka.M et al., "Improvement of float charge durability for LiCoO2 electrodes under high voltage and storage temperature by suppressing O1-Phase transition", Journal of Power Sources, Jul. 1, 2020, vol. 463, pp. 228127-1-228127-8, Elsevier.
Wang.L et al., "A Novel Bifunctional Self-Stabilized Strategy Enabling 4.6 V LiCoO2 with Excellent Long-Term Cyclability and High-Rate Capability", Adv. Sci. (Advanced Science), Apr. 24, 2019, vol. 6, No. 12, pp. 1900355-1-1900355-11.
Okumura.T et al., "Correlation of lithium ion distribution and X-ray absorption near-edge structure in O3- and O2-lithium cobalt oxides from first-principle calculation", J. Mater. Chem. (Journal of Materials Chemistry), 2012, vol. 22, pp. 17340-17348.
Yano.A et al., "LiCoO2 Degradation Behavior in the High-Voltage Phase Transition Region and Improved Reversibility with Surface Coating", J. Electrochem. Soc. (Journal of the Electrochemical Society), Nov. 12, 2016, vol. 164, No. 1, pp. A6116-A6122.
Wang.Z et al., "EELS analysis of cation valence states and oxygen vacancies in magnetic oxides", Micron, Oct. 1, 2000, vol. 31, No. 5, pp. 571-580, Elsevier.
Chung.K et al., "Structural Studies on the Effects of ZrO2 Coating on LiCoO2 during Cycling Using In Situ X-Ray Diffraction Technique", J. Electrochem. Soc. (Journal of the Electrochemical Society), Sep. 20, 2006, vol. 153, No. 11, pp. A2152-A2157.
Chen.Z et al., "Staging Phase Transitions in LixCoO2", J. Electrochem. Soc. (Journal of the Electrochemical Society), Oct. 29, 2002, vol. 149, No. 12, pp. A1604-A1609.
Ohzuku.T et al., "Solid-State Redox Reactions of LiCoO2 (R-3m) for 4 Volt Secondary Lithium Cells", J. Electrochem. Soc. (Journal of the Electrochemical Society), Nov. 1, 1994, vol. 141, No. 11, pp. 2972-2977.
Zou.M et al., "Synthesis and Electrochemical Performance of High Voltage Cycling LiM0.05Co0.95O2 as Cathode Material for Lithium Rechargeable Cells", Electrochemical and Solid-State Letters, Apr. 26, 2004, vol. 7, No. 7, pp. A176-A179.
Kim.Y et al., "Suppression of Cobalt Dissolution from the LiCoO2 Cathodes with Various Metal-Oxide Coatings", J. Electrochem. Soc. (Journal of the Electrochemical Society), Nov. 5, 2003, vol. 150, No. 12, pp. A1723-A1725.
Liu.A et al., "Synthesis of Mg and Mn Doped LiCoO2 and Effects on High Voltage Cycling", J. Electrochem. Soc. (Journal of the Electrochemical Society), Jun. 2, 2017, vol. 164, No. 7, pp. A1655-A1664.
Shim.J et al., "Effects of MgO Coating on the Structural and Electrochemical Characteristics of LiCoO2 as Cathode Materials

(56) References Cited

OTHER PUBLICATIONS for Lithium Ion Battery", Chem. Mater. (Chemistry of Materials), Mar. 24, 2014, vol. 26, No. 8, pp. 2537-2543.
Wang.Z et al., "Mg doping and zirconium oxyfluoride coating co-modification to enhance the high-voltage performance of LiCoO2 for lithium ion battery", Journal of Alloys and Compounds, Oct. 5, 2014, vol. 621, pp. 212-219.
Shim.J et al., "Synergistic effects of coating and doping for lithium ion battery cathode materials: synthesis and characterization of lithium titanate-coated LiCoO2 with Mg doping", Electrochimica Acta, Nov. 11, 2015, vol. 186, pp. 201-208, Elsevier.
Taguchi.N et al., "Characterization of MgO-coated-LiCoO2 particles by analytical transmission electron microscopy", Journal of Power Sources, Aug. 10, 2016, vol. 328, pp. 161-166, Elsevier.
Amatucci.G et al., "CoO2, The End Member of the LixCoO2 Solid Solution", J. Electrochem. Soc. (Journal of the Electrochemical Society), Mar. 1, 1996, vol. 143, No. 3, pp. 1114-1123.
Qian.J et al., "Electrochemical surface passivation of LiCoO2 particles at ultrahigh voltage and its applications in lithium-based batteries", Nature Communications, Nov. 21, 2018, vol. 9, pp. 4918-1-4918-11.
Yin.R et al., "In Situ XRD Investigation and Thermal Properties of Mg Doped LiCoO2 for Lithium Ion Batteries", J. Electrochem. Soc. (Journal of the Electrochemical Society), Jan. 3, 2012, vol. 159, No. 3, pp. A253-A258.
Shao-horn. Y et al., "Probing Lithium and Vacancy Ordering in O3 Layered Lix CoO2 (x=0.5) : An Electron Diffraction Study", J. Electrochem. Soc. (Journal of the Electrochemical Society), Feb. 6, 2003, vol. 150, No. 3, pp. A366-A373.
Kalluri.S et al., "Surface Engineering Strategies of Layered LiCoO2 Cathode Material to Realize High-Energy and High-Voltage Li-Ion Cells", Advanced Energy Materials, Oct. 12, 2016, vol. 7, No. 1, pp. 1601507-1-1601507-21.
Zhang.S et al., "Surface engineering of LiCoO2 by a multifunctional nanoshell for stable 4.6V electrochemical performance", Energy Storage Materials, Feb. 21, 2023, vol. 57, pp. 289-298.
Yano.A et al., "Capability and Reversibility of LiCoO2 during Charge/Discharge with O3/H1-3 Layered Structure Change", J. Electrochem. Soc. (Journal of the Electrochemical Society), May 11, 2021, vol. 168, No. 5, pp. 050517-1-050517-11.
Chinese Office Action (Application No. 202080082758.8) Dated Jun. 13, 2026.

* cited by examiner

SECONDARY BATTERY

CROSS REFERENCE TO RELATED APPLICATIONS

This application is a U.S. National Phase Application under 35 U.S.C. § 371 of International Application PCT/IB2020/061201, filed on Nov. 27, 2020, which is incorporated by reference and claims the benefit of a foreign priority application filed in Japan on Dec. 10, 2019, as Application No. 2019-223211.

TECHNICAL FIELD

One embodiment of the present invention relates to an object, a method, or a manufacturing method. Alternatively, the present invention relates to a process, a machine, manufacture, or a composition (composition of matter). One embodiment of the present invention relates to a semiconductor device, a display device, a light-emitting device, a power storage device, a lighting device, an electronic device, or a manufacturing method thereof. In particular, one embodiment of the present invention relates to a positive electrode active material that can be used for a secondary battery, a secondary battery, and an electronic device including a secondary battery.

Note that in this specification, a power storage device refers to every element and device having a function of storing power. Examples of the power storage device include a storage battery (also referred to as a secondary battery) such as a lithium-ion secondary battery, a lithium-ion capacitor, and an electric double layer capacitor.

In addition, electronic devices in this specification mean all devices including power storage devices, and electro-optical devices including power storage devices, information terminal devices including power storage devices, and the like are all electronic devices.

BACKGROUND ART

In recent years, a variety of power storage devices such as lithium-ion secondary batteries, lithium-ion capacitors, air batteries, and all-solid-state batteries have been actively developed. In particular, demand for lithium-ion secondary batteries with high output and high capacity has rapidly grown with the development of the semiconductor industry, and the lithium-ion secondary batteries are essential as rechargeable energy supply sources for today's information society.

Moreover, among the lithium-ion secondary batteries, an all-solid-state battery having higher safety has been developed.

Patent Document 1 discloses a secondary battery using an oxide-based all-solid-state battery.

PRIOR ART DOCUMENT

Patent Document

[Patent Document 1] Japanese Published Patent Application No. 2019-102261

SUMMARY OF THE INVENTION

Problems to be Solved by the Invention

There is room for improvements in a variety of aspects of secondary batteries, such as charge and discharge characteristics, cycle performance, reliability, safety, and costs. For example, regarding cycle performance, a crystal structure of a positive electrode active material may be broken as charge and discharge are repeated, which might lead to a reduction in charge and discharge capacity. Moreover, a side reaction may occur, for example, at the interface between a positive electrode active material and a solid electrolyte or the interface between a positive electrode active material and a positive electrode current collector, which might also lead to a reduction in charge and discharge capacity.

In view of the above, an object of one embodiment of the present invention is to provide a secondary battery in which a side reaction does not easily occur, for example, at the interface between a positive electrode active material and a solid electrolyte or the interface between a positive electrode active material and a positive electrode current collector even when charge and discharge are repeated. Another object is to provide a secondary battery with excellent charge and discharge cycle performance. Another object is to provide a secondary battery with high charge and discharge capacity. Another object is to provide a secondary battery in which a decrease in capacity in charge and discharge cycles is inhibited. Another object is to provide a highly safe or reliable secondary battery.

Another object of one embodiment of the present invention is to provide a novel material, novel active material particles, a novel power storage device, or a manufacturing method thereof.

Note that the description of these objects does not preclude the existence of other objects. One embodiment of the present invention does not have to achieve all these objects. Other objects can be derived from the description of the specification, the drawings, and the claims.

Means for Solving the Problems

In one embodiment of the present invention, a buffer layer or a protective layer is provided on a surface of a current collector or between a current collector layer and an active material layer to prevent deterioration such as oxidation of the current collector.

It is preferable to use a material having conductivity for the buffer layer or the protective layer. Moreover, a material that is likely to inhibit oxidation is preferably used. For example, it is possible to use a titanium compound such as titanium oxide, titanium nitride, titanium oxide in which nitrogen is substituted for part of oxygen, titanium nitride in which oxygen is substituted for part of nitrogen, or titanium oxynitride ($TiO_xN_y$, where $0<x<2$ and $0<y<1$). Titanium nitride is particularly preferable because it has high conductivity and has a high capability of inhibiting oxidation.

One embodiment of the present invention is a secondary battery including a stack body in which a positive electrode current collector layer that is an aggregate of first metal particles, a positive electrode active material layer, a solid electrolyte layer, a negative electrode active material layer, and a negative electrode current collector layer that is an aggregate of second metal particles are stacked in this order, and a first buffer layer between the first metal particles and the positive electrode active material layer or a second buffer layer between the negative electrode active material layer and the second metal particles.

In the above structure, the first buffer layer includes a particle of titanium nitride. In the above structure, the second buffer layer includes a particle of titanium nitride.

In the above structure, the first metal particle may be a metal particle a surface of which is provided with a titanium nitride film.

In the above structure, the second metal particle may be a metal particle a surface of which is provided with a titanium nitride film.

A secondary battery in which a metal particle a surface of which is provided with a titanium nitride film is used for a positive electrode current collector layer is also one embodiment of the present invention. A structure of the invention is a secondary battery including a stack body in which a positive electrode current collector layer that is an aggregate of first metal particles, a positive electrode active material layer, a solid electrolyte layer, a negative electrode active material layer, and a negative electrode current collector layer that is an aggregate of second metal particles are stacked in this order, and the first metal particle is a metal particle a surface of which is provided with a titanium nitride film.

Furthermore, a secondary battery in which a metal particle a surface of which is provided with a titanium nitride film is used for a negative electrode current collector layer is also one of the present invention. A structure of the invention is a secondary battery including a stack body in which a positive electrode current collector layer that is an aggregate of first metal particles, a positive electrode active material layer, a solid electrolyte layer, a negative electrode active material layer, and a negative electrode current collector layer that is an aggregate of second metal particles are stacked in this order, and the second metal particle is a metal particle a surface of which is provided with a titanium nitride film.

Note that in this specification and the like, an electrolyte refers to not only a solid electrolyte but also an electrolytic solution in which lithium salt is dissolved in a liquid solvent and an electrolytic solution in which lithium salt is dissolved in a gelled compound.

Effect of the Invention

One embodiment of the present invention can provide a secondary battery in which a side reaction does not easily occur, for example, at the interface between a positive electrode active material and an electrolyte or the interface between a positive electrode active material and a positive electrode current collector even when charge and discharge are repeated. A secondary battery having a crystal structure that is not easily broken even when charge and discharge are repeated can be provided. A secondary battery with excellent charge and discharge cycle performance can be provided. A secondary battery with high charge and discharge capacity can be provided. In addition, a secondary battery in which a reduction in capacity due to charge and discharge cycles is inhibited can be provided. A highly safe or reliable secondary battery can be provided.

One embodiment of the present invention can provide a novel material, novel active material particles, a novel power storage device, or a manufacturing method thereof.

Note that the description of these effects does not preclude the existence of other effects. One embodiment of the present invention does not have to have all of these effects. Other effects will be apparent from and can be derived from the description of the specification, the drawings, the claims, and the like.

MODE FOR CARRYING OUT THE INVENTION

Embodiments of the present invention will be described in detail below with reference to the drawings. Note that the present invention is not limited to the following description, and it is readily understood by those skilled in the art that modes and details of the present invention can be modified in various ways. In addition, the present invention should not be construed as being limited to the description of the embodiments below.

Embodiment 1

Figure 1A:
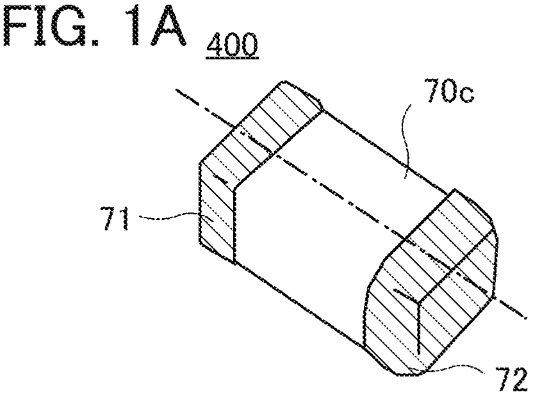
FIG. 1A is a perspective view illustrating one embodiment of the present invention.

FIG. 1A shows a perspective view of an all-solid-state secondary battery including external electrodes 71 and 72 and sealed with a package component.

Figure 1B:
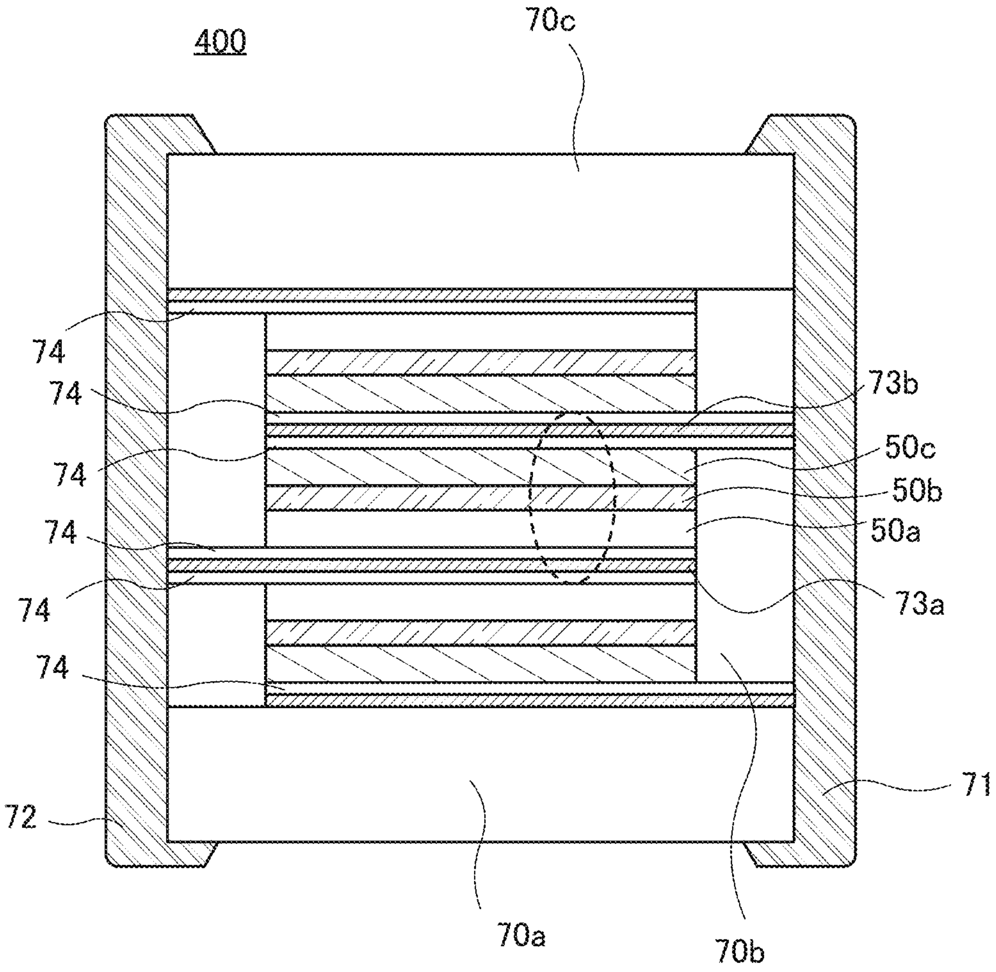
FIG. 1B is a schematic cross-sectional view illustrating one embodiment of the present invention.

FIG. 1B shows an example of a cross section cut along the dashed-dotted line in FIG. 1A. A stack body is surrounded and sealed by a package component 70*a* where a positive electrode current collector layer 73*a* containing metal particles is provided, a frame-like package component 70*b*, and a package component 70*c* where a negative electrode current collector layer 73*b* containing metal particles is provided. For the package components 70*a*, 70*b*, and 70*c*, an insulating material such as a resin material or ceramic can be used.

The external electrode 72 is electrically connected to a positive electrode active material layer 50*a* through the positive electrode current collector layer 73*a* both surfaces or one surface of which is provided with a buffer layer 74, and function as a positive electrode. The external electrode 71 is electrically connected to a negative electrode active material layer 50*c* through a negative electrode current collector layer 73*b* both surfaces of which are provided with the buffer layer 74, and functions as a negative electrode.

For the positive electrode current collector layer 73*a*, an aluminum particle or a copper particle is used.

For the buffer layer 74, it is possible to use a titanium compound such as titanium nitride, titanium nitride in which oxygen is substituted for part of nitrogen, or titanium oxynitride ($TiO_xN_y$, where 0<x<2 and 0<y<1). Titanium nitride is particularly preferable because it has high conductivity and has a high capability of inhibiting oxidation. In this embodiment, a titanium nitride powder (grain size greater than or equal to 0.7 μm and 2.5 μm) is used.

The positive electrode active material layer 50*a* contains lithium, a transition metal M, and oxygen. In other words, the positive electrode active material layer 50*a* includes a composite oxide containing lithium and the transition metal M.

As the transition metal M contained in the positive electrode active material layer 50*a*, a metal that can form, together with lithium, a layered rock-salt composite oxide belonging to the space group R-3m is preferably used. As the transition metal M, one or more of manganese, cobalt, and nickel can be used, for example. That is, as the transition metal contained in the positive electrode active material layer 50*a*, only cobalt may be used; only nickel may be used; two metals of cobalt and manganese or cobalt and nickel may be used; or three metals of cobalt, manganese, and nickel may be used. In other words, the positive electrode active material layer 50*a* can include a composite oxide containing lithium and the transition metal M, such as lithium cobalt oxide, lithium nickel oxide, lithium cobalt oxide in which manganese is substituted for part of cobalt, lithium cobalt oxide in which nickel is substituted for part of cobalt, or lithium nickel-manganese-cobalt oxide.

In addition to the above transition metal M, the positive electrode active material layer 50*a* may contain an element other than the transition metal M, such as magnesium, fluorine, or aluminum. Such elements further stabilize a crystal structure included in the positive electrode active material layer 50*a* in some cases. In other words, the positive electrode active material layer 50*a* can contain lithium cobalt oxide to which magnesium and fluorine are added, lithium nickel-cobalt oxide to which magnesium and fluorine are added, lithium cobalt-aluminum oxide to which magnesium and fluorine are added, lithium nickel-cobalt-aluminum oxide, lithium nickel-cobalt-aluminum oxide to which magnesium and fluorine are added, or the like.

When the positive electrode active material layer 50*a* contains lithium, cobalt, nickel, aluminum, magnesium, oxygen, and fluorine, given that the proportion of cobalt atoms included in the positive electrode active material layer 50*a* is 100, the proportion of nickel atoms is preferably greater than or equal to 0.05 and less than or equal to 2, further preferably greater than or equal to 0.1 and less than or equal to 1.5, still further preferably greater than or equal to 0.1 and less than or equal to 0.9, for example. Given that the proportion of cobalt atoms included in the positive electrode active material layer 101 is 100, the proportion of aluminum atoms is preferably greater than or equal to 0.05 and less than or equal to 2, further preferably greater than or equal to 0.1 and less than or equal to 1.5, still further preferably greater than or equal to 0.1 and less than or equal to 0.9, for example. Given that the proportion of cobalt atoms included in the positive electrode active material layer 50*a* is 100, the proportion of magnesium atoms is preferably greater than or equal to 0.1 and less than or equal to 6, further preferably greater than or equal to 0.3 and less than or equal to 3, for example. Given that the proportion of magnesium atoms included in the positive electrode active material layer 50*a* is 1, the proportion of fluorine atoms is preferably greater than or equal to 2 and less than or equal to 3.9, for example.

When nickel, aluminum, and magnesium are contained at the above concentrations, a stable crystal structure can be maintained even if the particle diameter is small or charge and discharge are repeated at high voltage. Thus, the positive electrode active material layer 50*a* can have high capacity and excellent charge and discharge cycle performance.

As a solid electrolyte layer 50*b*, a sulfide-based solid electrolyte, an oxide-based solid electrolyte, or a halide-based solid electrolyte can be used, for example.

Examples of the sulfide-based solid electrolyte include a thio-silicon-based material (e.g., $Li_{10}GeP_2S_{12}$ and $Li_{3.25}Ge_{0.25}P_{0.75}S_4$), sulfide glass (e.g., $70Li_2S \cdot 30P_2S_5$, $30Li_2S \cdot 26B_2S_3 \cdot 44LiI$, $63Li_2S \cdot 38SiS_2 \cdot 1Li_3PO_4$, $57Li_2S \cdot 38SiS_2 \cdot 5Li_4SiO_4$, and $50Li_2S \cdot 50GeS_2$), and sulfide-based crystallized glass (e.g., $Li_7P_3S_{11}$ and $Li_{3.25}P_{0.95}S_4$). The sulfide-based solid electrolyte has advantages such as high conductivity of some materials, low-temperature synthesis, and ease of maintaining a conduction path after charge and discharge because of its relative softness.

Examples of the oxide-based solid electrolyte include a material with a perovskite crystal structure (e.g., $La_{2/3-x}Li_{3x}TiO_3$), a material with a NASICON crystal structure (e.g., $Li_{1-X}Al_XTi_{2-X}(PO_4)_3$), a material with a garnet crystal structure (e.g., $Li_7La_3Zr_2O_{12}$), a material with a LISICON crystal structure (e.g., $Li_{14}ZnGe_4O_{16}$), oxide glass (e.g., $Li_3PO_4$—$Li_4SiO_4$ and $50Li_4SiO_4.50Li_3BO_3$), and oxide-based crystallized glass (e.g., $Li_{1.07}Al_{0.69}Ti_{1.46}(PO_4)_3$ and $Li_{1.5}Al_{0.5}Ge_{1.5}(PO_4)_3$). The oxide-based solid electrolyte has an advantage of stability in the air.

Examples of the halide-based solid electrolyte include $LiAlCl_4$, $Li_3InBr_6$, LiF, LiCl, LiBr, and LiI. Moreover, a composite material in which pores of porous aluminum or porous silica are filled with such a halide-based solid electrolyte can be used as the solid electrolyte.

Alternatively, different solid electrolytes may be mixed and used.

In particular, $Li_{1+x}Al_xTi_{2-x}(PO_4)_3$ (0<x<1) with a NASICON crystal structure (hereinafter LATP) is preferable because LATP contains aluminum, which is the element included in the positive electrode active material of one embodiment of the present invention, and thus a synergistic effect of improving the cycle performance is expected. Moreover, higher productivity due to the reduction in the number of steps is expected. Note that in this specification and the like, a material with a NASICON crystal structure refers to a compound that is represented by $M_2(XO_4)_3$ (M: transition metal; X: S, P, As, Mo, W, or the like) and has a structure in which $MO_6$ octahedra and $XO_4$ tetrahedra that share common corners are arranged three-dimensionally.

For the negative electrode active material layer 50*c*, silicon, carbon, titanium oxide, vanadium oxide, indium oxide, zinc oxide, tin oxide, nickel oxide, or the like can be used. A material that is alloyed with Li, such as tin, gallium, or aluminum can be used. Alternatively, an oxide of such a metal that is alloyed with Li may be used. A lithium titanium oxide ($Li_4Ti_5O_{12}$, $LiTi_2O_4$, or the like) may be used; in particular, a material containing silicon and oxygen (also referred to as a SiOx film) is preferable. A Li metal may also be used for the negative electrode active material layer 50*c*.

As the negative electrode current collector layer 73*b*, a copper particle may be used.

Although FIG. 1B illustrates an example of stacking three stacks each of which includes the positive electrode current collector layer 73*a*, the buffer layer 74, the positive electrode active material layer 50*a*, the solid electrolyte layer 50*b*, the negative electrode active material layer 50*c*, the buffer layer 74, and the negative electrode current collector layer 73*b* as one set, four or more stacks may be stacked.

Figure 2:
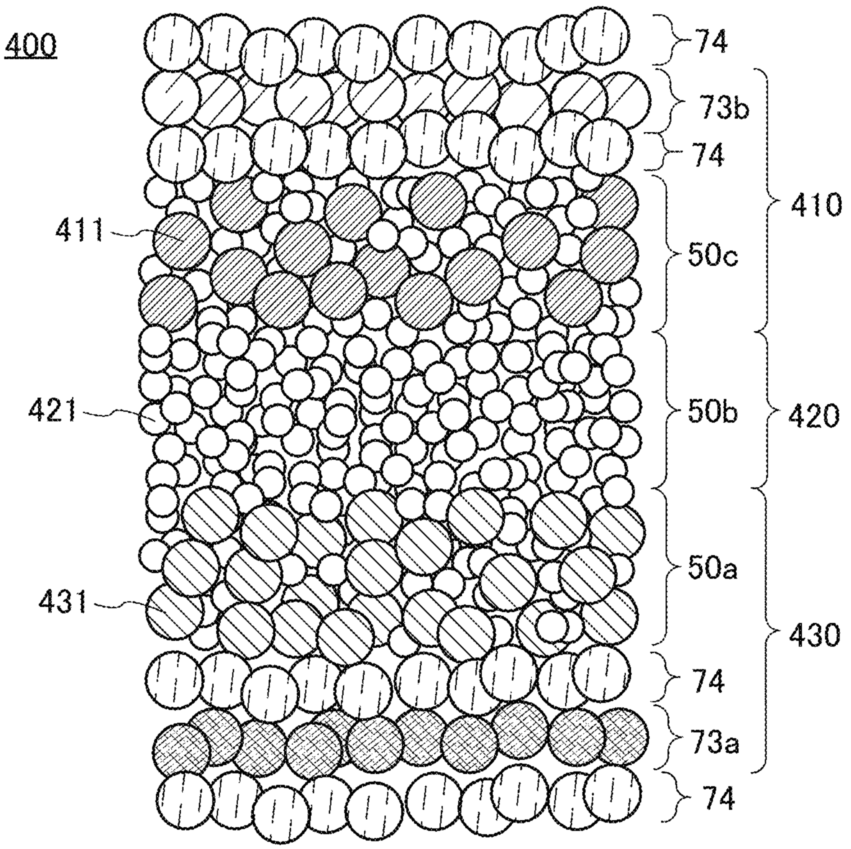
FIG. 2 is an enlarged schematic cross-sectional view illustrating part of a secondary battery showing one embodiment of the present invention.

Each layer is composed of particles, though it is illustrated as a schematic view in FIG. 1B, and a secondary battery including such layers is also called a bulk-type all-solid-state battery. FIG. 2 is an enlarged schematic view of a region indicated by the dotted line in FIG. 1B. Note that although spherical particles are illustrated schematically in FIG. 2, the shape and the size of particles are not particularly limited to those in FIG. 2.

As illustrated in FIG. 2, a secondary battery 400 of one embodiment of the present invention includes a positive electrode 430, the solid electrolyte layer 50*b*, and a negative electrode 410.

In FIG. 2, the positive electrode 430 includes the positive electrode current collector layer 73*a*, the buffer layer 74, and the positive electrode active material layer 50*a*. The positive electrode current collector layer 73*a* may contain a solid electrolyte 421, a conductive material (also called a conductive additive), or a binder, besides a positive electrode active material 431.

The negative electrode 410 includes the negative electrode current collector layer 73*b*, the buffer layer 74, and the negative electrode active material layer 50*c*. The negative electrode current collector layer 73*b* may further contain the solid electrolyte 421, a conductive material (also called a conductive additive), or a binder, besides a negative electrode active material 411.

The solid electrolyte layer 50*b* includes the solid electrolyte 421. A solid electrolyte layer 420 is positioned between the positive electrode 430 and the negative electrode 410, and is a region that includes neither the positive electrode active material 431 nor the negative electrode active material 411.

When a secondary battery is manufactured, paste for the positive electrode 430, paste for the solid electrolyte layer 50*b*, and paste for the negative electrode 410 are formed and applied, so that respective paste layers are formed. Examples of applicable application method for forming a paste layer include a die coating method, a spray coating method, a dipping method, a spin coating method, a relief printing method, an offset printing method, a gravure printing method, and a screen printing method. In addition, paste for the positive electrode current collector layer, paste for the negative electrode current collector layer, and paste for the buffer layer are formed and each applied over a support substrate, so that respective paste layers are formed. It is preferable that a material adding peelability be formed in advance on the support substrate because layer separation is performed later. For example, a resin film including a binder or the like is preferably formed as pretreatment.

Each of the paste layer for the positive electrode current collector layer, the paste layer for the negative electrode current collector layer, the paste layer for the buffer layer, the paste layer for the positive electrode, the paste layer for the solid electrolyte layer, and the paste layer for the negative electrode is formed on the support substrate and removed from the support substrate. Then, the separated layers are stacked.

A stack body in which the layers are stacked in the above manner is pressed or baked.

The stack body is cut into a desired shape and then surrounded with the package component. Alternatively, the stack body may be framed and pressed so as not to spread, and then may be surrounded with the package component.

Lastly, the end face of the stack body surrounded with the package component is dipped into conductive paste. After that, baking is performed, so that the external electrodes 71 and 72 are formed, resulting in an all-solid-state secondary battery sealed by the package component illustrated in FIG. 1A.

The all-solid-state secondary battery illustrated in FIG. 1A can be formed into, for example, a rectangular solid shape to have a dimension (the first side×the second side×height) of 3.5 mm×2.5 mm×2 mm, 4.5 mm×3 mm×1 mm, or 10 mm×10 mm×6 mm.

This embodiment can be implemented in appropriate combination with the other embodiments.

Embodiment 2

In this embodiment, an example partly different from in Embodiment 1 will be described.

Whereas Embodiment 1 shows the example in which the buffer layer is composed of an aggregate of particles, this embodiment shows an example in which the buffer layer is formed on surfaces of current collector particles.

Figure 3A:
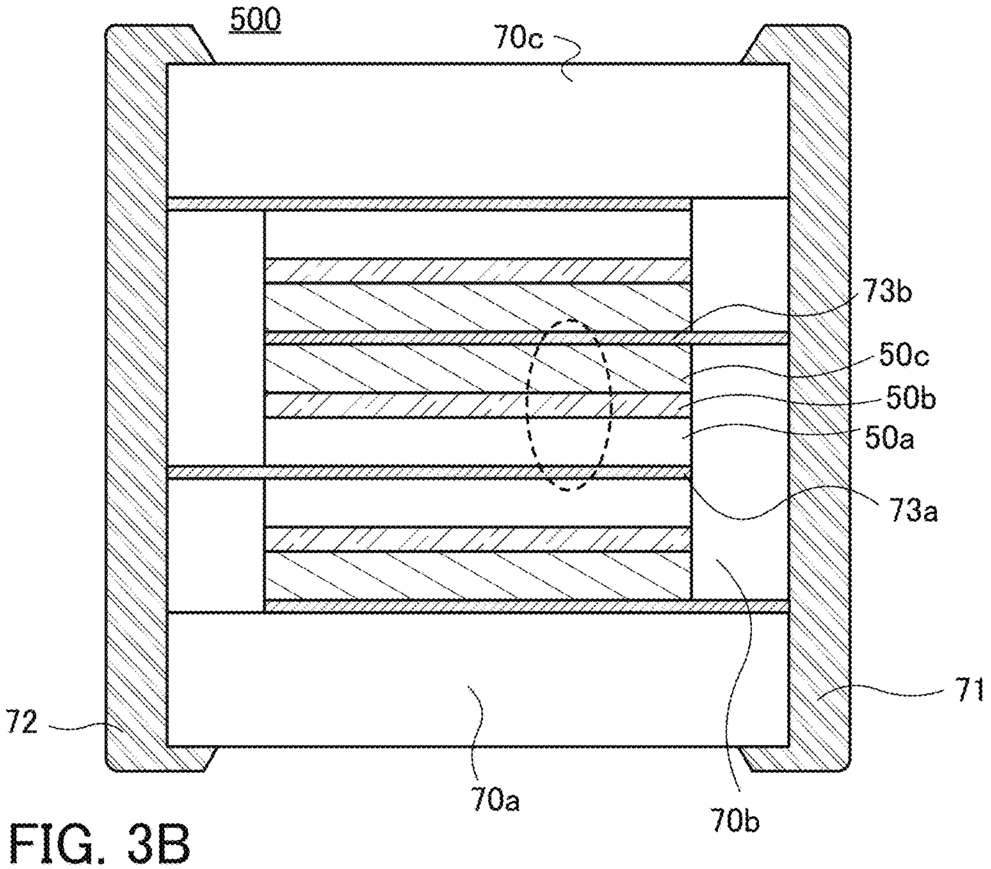
FIG. 3A is an enlarged schematic cross-sectional view illustrating part of a secondary battery showing one embodiment of the present invention.

FIG. 3A is a schematic cross-sectional view of a secondary battery 500. Note that portions that are the same as those in FIG. 1B are denoted by the same reference numerals. FIG. 3A has a difference from FIG. 1B in that the buffer layer 74 is not illustrated.

Figure 3B:
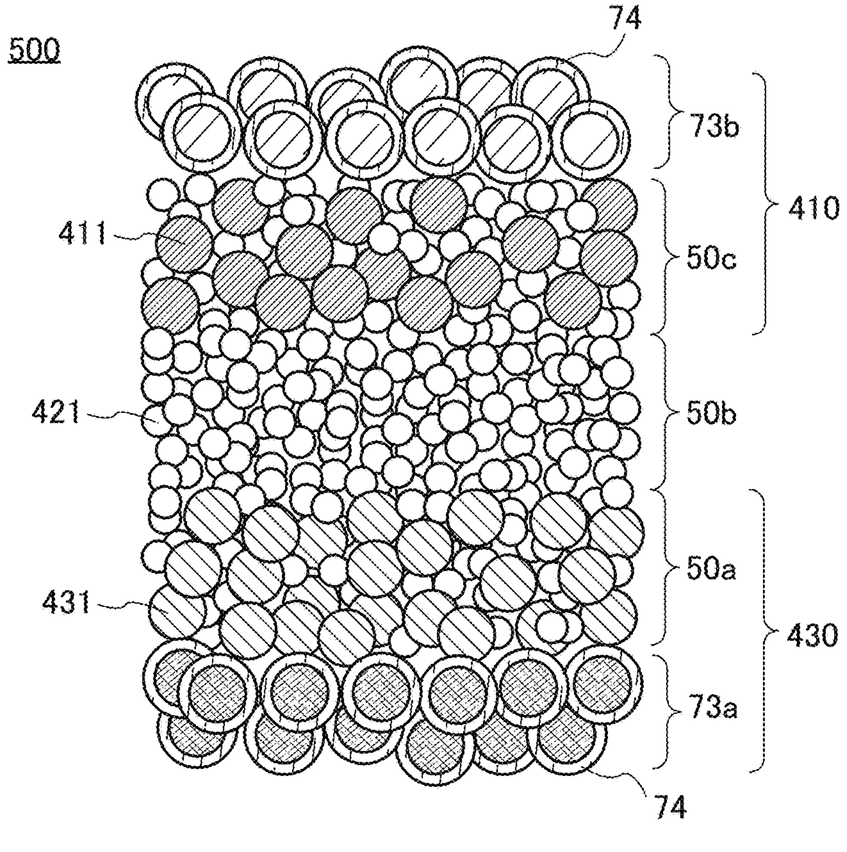
FIG. 3B is an enlarged schematic cross-sectional view illustrating part of the secondary battery in FIG. 3A.

FIG. 3B shows an example of an enlarged view of a portion indicated by the dotted line in FIG. 3A, and portions that are the same as those in FIG. 2 are denoted by the same reference numerals. FIG. 3B has a difference from FIG. 2 in that the buffer layer 74 is formed on surfaces of the current collector particles.

Film deposition is performed on the surfaces of current collector particles by a barrel sputtering method or the like, whereby the current collector particles coated with the buffer layer 74 can be formed.

In the example shown in FIG. 3B, the buffer layer 74 is formed on surfaces of the positive electrode current collector particles and the buffer layer 74 is formed on surfaces of the negative electrode current collector particles; however, one embodiment of the present invention is not particularly limited to this example. The buffer layer may be formed only on either the positive electrode current collector or the negative positive electrode current collector.

In addition, this embodiment can be freely combined with Embodiment 1.

Embodiment 3

As the positive electrode active material 431 described in Embodiment 1 or Embodiment 2, a positive active material containing lithium, cobalt, magnesium, aluminum, nickel, oxygen, and fluorine can be used.

Production of the positive electrode active material is described below with use of a production flow chart shown in FIG. 4.

<Step S21>

First, a halogen source such as a fluorine source or a chlorine source, a magnesium source, a nickel source, and an aluminum source are prepared as materials of a mixture 901. In addition, a lithium source is preferably prepared as well.

As the fluorine source, for example, lithium fluoride, magnesium fluoride, or the like can be used. Among them, lithium fluoride, which has a relatively low melting point of 848° C., is preferable because it is easily melted in an annealing process described later. As the chlorine source, for example, lithium chloride, magnesium chloride, or the like can be used. As the magnesium source, for example, magnesium fluoride, magnesium oxide, magnesium hydroxide, magnesium carbonate, or the like can be used. As a lithium source, lithium fluoride or lithium carbonate can be used, for example. That is, lithium fluoride can be used as both the lithium source and the fluorine source. Magnesium fluoride can be used as both the fluorine source and the magnesium source.

Figure 4:
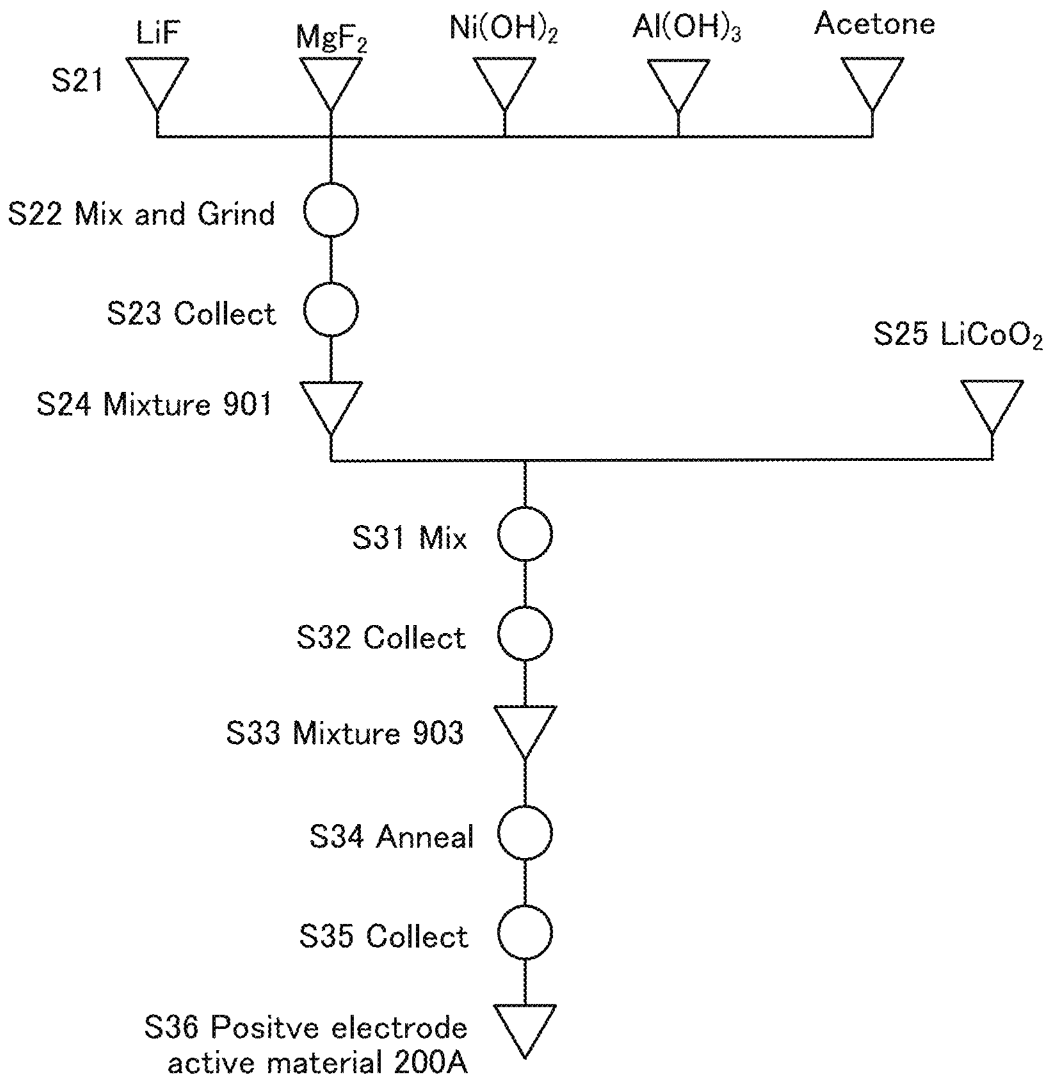
FIG. 4 is an example of a flow chart for producing a positive electrode active material showing one embodiment of the present invention.

In this embodiment, lithium fluoride LiF is prepared as the fluorine source and the lithium source, and magnesium fluoride $MgF_2$ is prepared as the fluorine source and the magnesium source (Step S21 in FIG. 4).

When lithium fluoride LiF and magnesium fluoride $MgF_2$ are mixed at $LiF:MgF_2$=approximately 65:35 (molar ratio), the effect of lowering the melting point is maximized. On the other hand, when the amount of lithium fluoride increases, excessive lithium might deteriorate cycle performance. Therefore, the molar ratio of lithium fluoride LiF to magnesium fluoride $MgF_2$ is preferably $LiF:MgF_2=x:1$ ($0 \leq x \leq 1.9$), further preferably $LiF:MgF_2=x:1$ ($0.1 \leq x \leq 0.5$), and still further preferably $LiF:MgF_2=x:1$ (x=the vicinity of 0.33).

As the nickel source, nickel hydroxide ($Ni(OH)_2$) can be used, for example. At this time, it is preferable that nickel source be pulverized. For example, nickel hydroxide is mixed and ground with acetone as a solvent by using a ball mill, a bead mill, or the like, whereby pulverized nickel hydroxide can be obtained.

As the aluminum source, aluminum hydroxide ($Al(OH)_3$) can be used, for example. It is preferable that the aluminum source be pulverized. For example, aluminum hydroxide be mixed and ground with acetone as a solvent by using a ball mill, a bead mill, or the like, whereby pulverized aluminum hydroxide can be obtained.

In addition, in the case where the following mixing and grinding step is performed by a wet process, a solvent is prepared. As the solvent, ketone such as acetone; alcohol such as ethanol or isopropanol; ether; dioxane; acetonitrile; N-methyl-2-pyrrolidone (NMP); or the like can be used. An aprotic solvent that hardly reacts with lithium is further preferably used. In this embodiment, acetone is used (see Step S21 in FIG. 4).

<Step S22>

Next, the materials of the mixture 901 are mixed and ground (Step S22 in FIG. 4). Although the mixing can be performed by a dry process or a wet process, the wet process is preferable because the materials can be ground to a smaller size. For example, a ball mill, a bead mill, or the like can be used for the mixing. When the ball mill is used, a zirconia ball can be used as media, for example. The mixing and grinding steps are preferably performed sufficiently to pulverize the mixture 901.

The mixing is preferably performed with a blender, a mixer, or a ball mill.

<Step S23, Step S24>

The materials mixed and ground in the above manner are collected (Step S23 in FIG. 4), whereby the mixture 901 is obtained (Step S24 in FIG. 4).

For example, the D50 of the mixture 902 is preferably greater than or equal to 600 nm and less than or equal to 20 μm, further preferably greater than or equal to 1 μm and less than or equal to 10 μm. When mixed with a composite oxide including lithium, a transition metal, and oxygen in a later step, the mixture 902 pulverized to such a small size is easily attached to surfaces of composite oxide particles uniformly. The mixture 902 is preferably attached to the surfaces of the composite oxide particles uniformly because both halogen and magnesium are easily distributed to the surface portion of the composite oxide particles after heating. When there is a region containing neither halogen nor magnesium in the surface portion, the positive electrode active material might be less likely to have an O3'-type crystal structure, which is described later, in the charged state.

<Step S25>

A composite oxide which is synthesized in advance and contains lithium, a transition metal, and oxygen is used as Step S25 in FIG. 4.

In the case where the composite oxide containing lithium, the transition metal, and oxygen that is synthesized in advance is used, a composite oxide with few impurities is preferably used. In this specification and the like, lithium, cobalt, nickel, manganese, aluminum, and oxygen are the main components of the composite oxide containing lithium, the transition metal, and oxygen and the positive electrode active material, and elements other than the main components are regarded as impurities. For example, when analyzed with a glow discharge mass spectroscopy method, the total impurity concentration is preferably less than or equal to 10000 ppm wt, further preferably less than or equal to 5000 ppm wt. In particular, the total impurity concentration of transition metals such as titanium and arsenic is preferably less than or equal to 3,000 ppm wt, further preferably less than or equal to 1,500 ppm wt.

For example, as lithium cobalt oxide synthesized in advance, a lithium cobalt oxide particle (product name: CELLSEED C-10N) formed by NIPPON CHEMICAL INDUSTRIAL CO., LTD. can be used. This is lithium cobalt oxide in which the median diameter (D50) is approximately 12 μm, and in the impurity analysis by a glow discharge mass spectroscopy method (GD-MS), the magnesium concentration and the fluorine concentration are less than or equal to 50 ppm wt, the calcium concentration, the aluminum concentration, and the silicon concentration are less than or equal to 100 ppm wt, the nickel concentration is less than or equal to 150 ppm wt, the sulfur concentration is less than or equal to 500 ppm wt, the arsenic concentration is less than or equal to 1100 ppm wt, and the concentrations of elements other than lithium, cobalt, and oxygen are less than or equal to 150 ppm wt.

The composite oxide containing lithium, the transition metal, and oxygen in Step S25 preferably has a layered rock-salt crystal structure with few defects and distortions. Therefore, the composite oxide is preferably a composite oxide with few impurities. In the case where the composite oxide containing lithium, the transition metal, and oxygen includes a large number of impurities, the crystal structure is highly likely to have a large number of defects or distortions.

<Step S31>

Next, the mixture 901 and the composite oxide containing lithium, the transition metal, and oxygen are mixed (Step S31 in FIG. 4). The atomic ratio of the transition metal TM in the composite oxide containing lithium, the transition metal, and oxygen to magnesium MgMix1 contained in the mixture 902 is preferably TM:MgMix1=1:y ($0.005 \le y \le 0.05$), further preferably TM:$Mg_{Mix1}$=1:y ($0.007 \le y \le 0.04$), still further preferably approximately TM:$Mg_{Mix1}$=1:0.02.

The condition of the mixing in Step S31 is preferably milder than that of the mixing in Step S22 in order not to damage the particles of the composite oxide. For example, a condition with a lower rotation frequency or shorter time than the mixing in Step S22 is preferable. In addition, it can be said that the dry process has a milder condition than the wet process. For example, a ball mill, a bead mill, or the like can be used for the mixing. When the ball mill is used, a zirconia ball can be used as media, for example.

The materials mixed in the above manner are collected (Step S32 in FIG. 4), whereby a mixture 903 is obtained (Step S33 in FIG. 4).

Next, the mixture 903 is heated (Step S34 in FIG. 4). This step is sometimes referred to as annealing or baking.

The annealing is preferably performed at an appropriate temperature for an appropriate time. The appropriate temperature and time depend on the conditions such as the particle size and the composition of the composite oxide containing lithium, the transition metal, and oxygen in Step S25. In the case where the particle size is small, the annealing is preferably performed at a lower temperature or for a shorter time than the case where the particle size is large, in some cases.

When the median diameter (D50) of the particles in Step S25 is approximately 12 μm, for example, the annealing temperature is preferably higher than or equal to 700° C. and lower than or equal to 950° C., for example. The annealing time is preferably longer than or equal to 3 hours, further preferably longer than or equal to 10 hours, still further preferably longer than or equal to 60 hours, for example.

The temperature decreasing time after the annealing is, for example, preferably longer than or equal to 10 hours and shorter than or equal to 50 hours.

It is considered that when the mixture 903 is annealed, a material having a low melting point (e.g., lithium fluoride, which has a melting point of 848° C.) in the mixture 903 is melted first and distributed to the surface portion of the composite oxide particle. Next, the existence of the melted material decreases the melting points of other materials, presumably resulting in melting of the other materials. For example, magnesium fluoride (melting point: 1263° C.) is presumably melted and distributed to the surface portion of the composite oxide particle.

The elements included in the mixture 903 are diffused faster in the surface portion and the vicinity of the grain boundary than inside the composite oxide particles. Therefore, magnesium and halogen are higher in concentration in the surface portion and the vicinity of the grain boundaries than in the inner portion. As described later, the higher the magnesium concentration in the surface portion and the vicinity of the grain boundaries is, the more effectively the change in the crystal structure can be inhibited.

The material annealed in the above manner is collected (Step S35 in FIG. 4). Then, the particles are preferably made to pass through a sieve. Through the above steps, a positive electrode active material 200A of one embodiment of the present invention can be produced (Step S36 in FIG. 4).

The positive electrode active material 200A is described with reference to FIG. 6 to FIG. 9.

<Conventional Positive Electrode Active Material>

Figure 8:
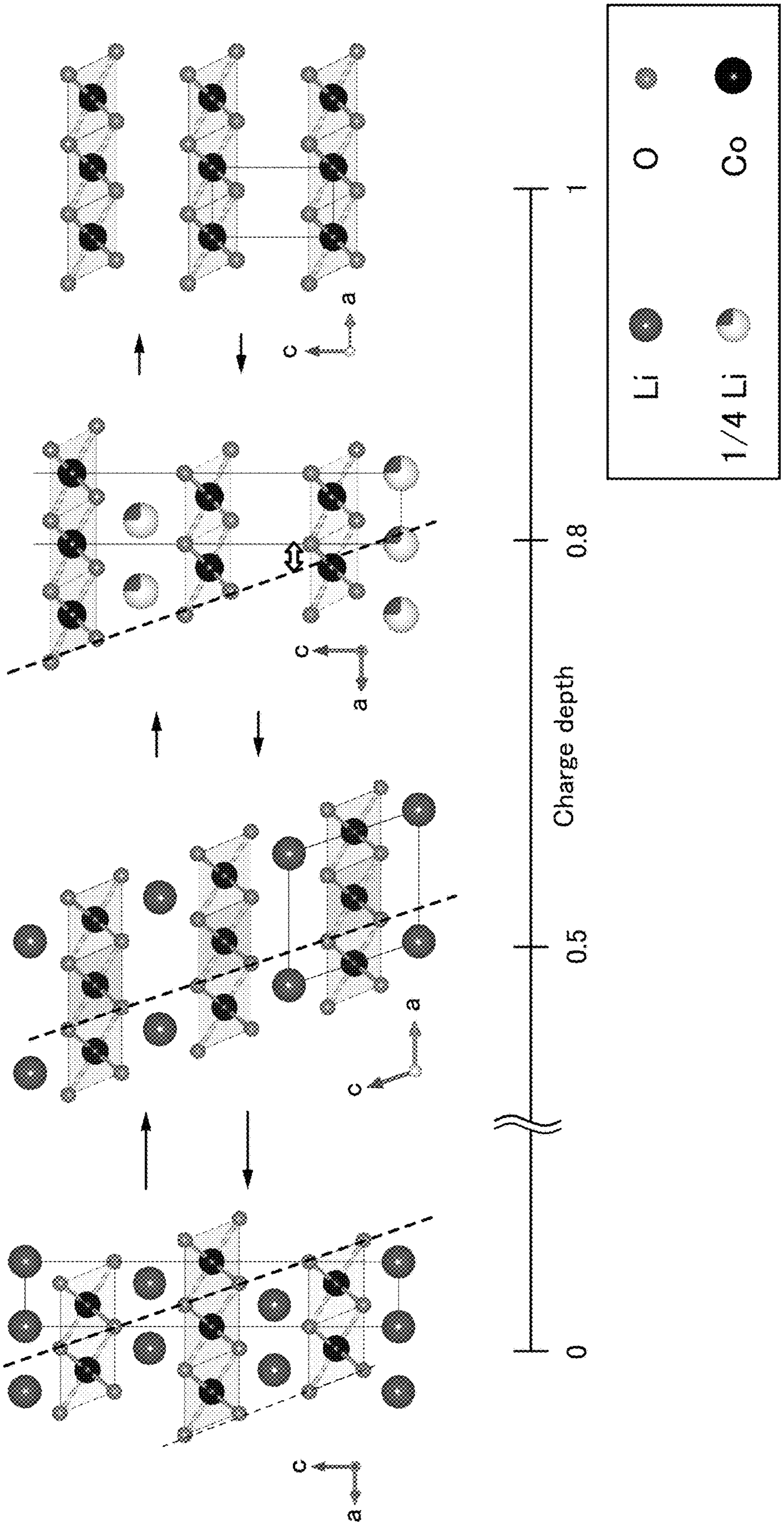
FIG. 8 is a diagram illustrating the charge depth and crystal structures of a positive electrode active material for a comparison example.

A positive electrode active material shown in FIG. 8 is lithium cobalt oxide ($LiCoO_2$) to which halogen and magnesium are not added in a production method described later. The crystal structure of lithium cobalt oxide illustrated in FIG. 8 is changed depending the depth of charge.

As shown in FIG. 8, in lithium cobalt oxide with a charge depth of 0 (discharged state), there is a region having a crystal structure of the space group R-3m, lithium occupies octahedral sites, and a unit cell includes three $CoO_2$ layers. Thus, this crystal structure is referred to as an O3-type crystal structure in some cases. Note that the $CoO_2$ layer has a structure in which octahedral geometry with oxygen hexacoordinated to cobalt continues on a plane in the edge-sharing state.

When the charge depth is 1, $LiCoO_2$ has the crystal structure of the space group P-3m1, and one $CoO_2$ layer exists in a unit cell. Thus, this crystal structure is referred to as an O1-type crystal structure in some cases.

Moreover, lithium cobalt oxide when the charge depth is approximately 0.8 has the crystal structure of the space group R-3m. This structure can also be regarded as a structure in which $CoO_2$ structures such as P-3m1 (O1) and $LiCoO_2$ structures such as R-3m (O3) are alternately stacked. Thus, this crystal structure is referred to as an H1-3 type crystal structure in some cases. Note that the number of cobalt atoms per unit cell in the actual H1-3 type crystal structure is twice as large as that of cobalt atoms per unit cell in other structures. However, in this specification including FIG. 8, the c-axis of the H1-3 type crystal structure is half that of the unit cell for easy comparison with the other structures.

For the H1-3 type crystal structure, as disclosed in Non-Patent Document 3, the coordinates of cobalt and oxygen in the unit cell can be expressed as follows, for example: Co (0, 0, 0.42150±0.00016), $O_1$ (0, 0, 0.27671±0.00045), and $O_2$ (0, 0, 0.11535±0.00045). $O_1$ and $O_2$ are each an oxygen atom. In this manner, the H1-3 type crystal structure is represented by a unit cell including one cobalt and two oxygen. Meanwhile, the O3' type crystal structure of one embodiment of the present invention is preferably represented by a unit cell including one cobalt and one oxygen, as described later. This means that the symmetry of cobalt and oxygen differs between the O3' type crystal structure and the H1-3 type structure, and the amount of change from the O3 structure is smaller in the O3'-type crystal structure than in the H1-3 type structure. A preferred unit cell for representing a crystal structure in a positive electrode active material is selected such that the value of GOF (good of fitness) is smaller in the Rietveld analysis of XRD, for example.

When charge with a high voltage of 4.6 V or higher based on the redox potential of a lithium metal or charge with a large charge depth of 0.8 or more and discharge are repeated, the crystal structure of lithium cobalt oxide changes (i.e., an unbalanced phase change occurs) repeatedly between the H1-3 type crystal structure and the R-3m (O3) structure in a discharged state.

However, there is a large deviation in the position of the $CoO_2$ layer between these two crystal structures. As indicated by the dotted lines and the arrows in FIG. 8, the $CoO_2$ layer in the H1-3 type crystal structure greatly shifts from that in R-3m (O3). Such a dynamic structural change might adversely affect the stability of the crystal structure.

A difference in volume is also large. The H1-3 type crystal structure and the O3 type crystal structure in a discharged state that contain the same number of cobalt atoms have a difference in volume of 3.0% or more.

In addition, a structure in which $CoO_2$ layers are continuous, such as P-3m1 (O1), included in the H1-3 type crystal structure is highly likely to be unstable.

Thus, the repeated high-voltage charge and discharge break the crystal structure of lithium cobalt oxide. The break of the crystal structure degrades the cycle performance. This is probably because the break of the crystal structure reduces sites where lithium can stably exist and makes it difficult to insert and extract lithium.

<Positive Electrode Active Material 200A of one Embodiment of the Present Invention>

<<Inner Portion>>

In the positive electrode active material 200A of one embodiment of the present invention, a deviation in the $CoO_2$ layers can be small in repeated high-voltage charge and discharge. Furthermore, the change in the volume can be small. Accordingly, the positive electrode active material of one embodiment of the present invention can achieve excellent cycle performance. In addition, the positive electrode active material of one embodiment of the present invention can have a stable crystal structure in a high-voltage charging state. Thus, in the positive electrode active material of one embodiment of the present invention, a short circuit is less likely to occur while the high-voltage charging state is maintained. This is preferable because the safety is further improved.

The positive electrode active material of one embodiment of the present invention has a small change in the crystal structure and a small difference in volume per the same number of transition metal atoms between a sufficiently discharging state and a high-voltage charging state.

Figure 6:
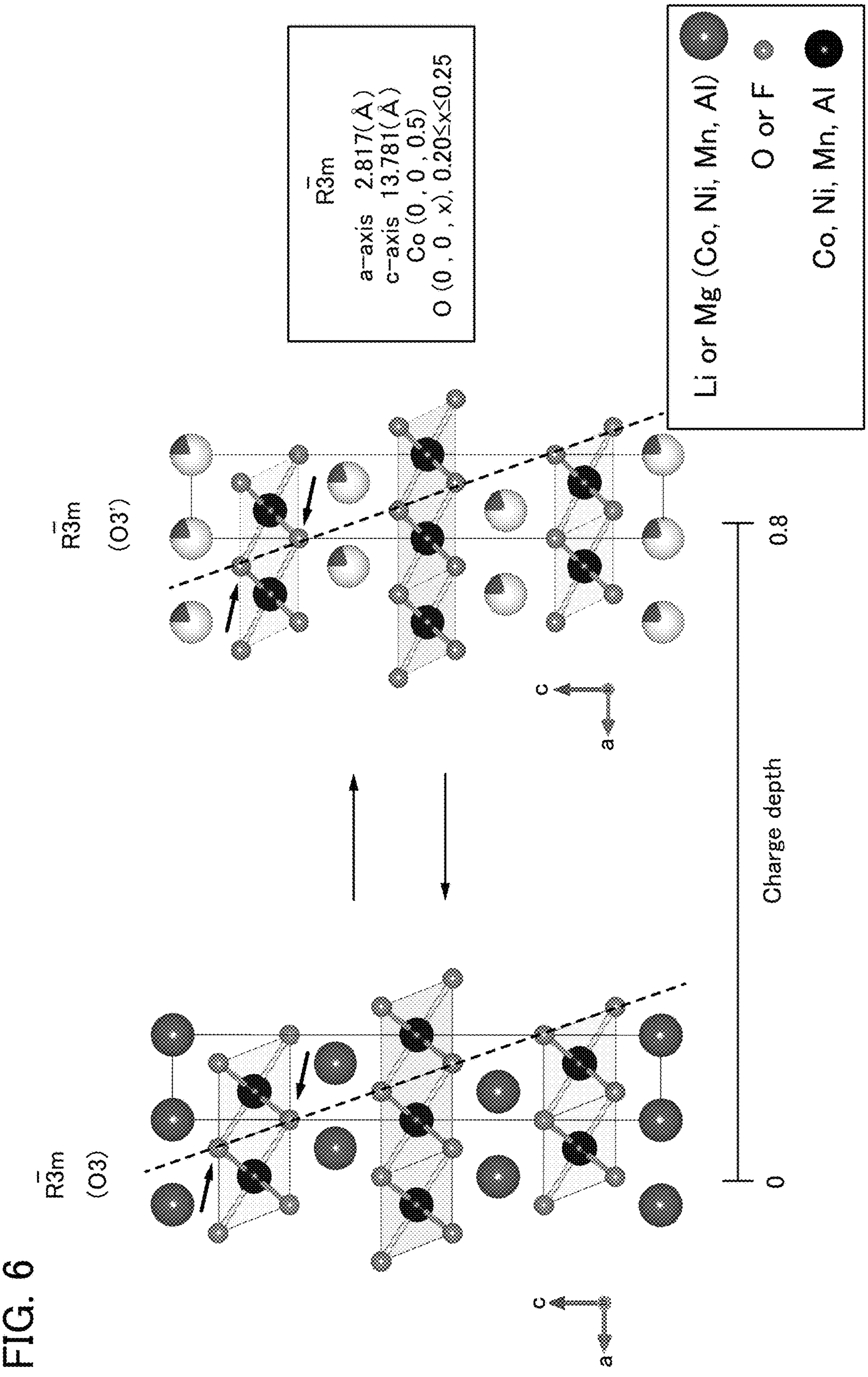
FIG. 6 is a diagram illustrating the charge depth and crystal structures of a positive electrode active material of one embodiment of the present invention.

FIG. 6 shows the crystal structures of the positive electrode active material 200A before and after being charged and discharged. The positive electrode active material 200A is a composite oxide containing lithium, cobalt as a transition metal, and oxygen. In addition to the above, the positive electrode active material 200A preferably contains magnesium. Furthermore, the positive electrode active material 200A preferably contains halogen such as fluorine or chlorine.

The crystal structure with a charge depth of 0 (in the discharged state) in FIG. 6 is R-3m (O3) as in FIG. 8. Meanwhile, the positive electrode active material 200A with a charge depth in a sufficiently charged state includes a crystal whose structure is different from the H1-3 type structure. This structure belongs to the space group R-3m, and is not a spinel type crystal structure but a structure in which oxygen is hexacoordinated to ions of cobalt, magnesium, or the like and the cation arrangement has symmetry similar to that of the spinel type crystal structure. Furthermore, the symmetry of $CoO_2$ layers of this structure is the same as that in the O3 type structure. This structure and the like are referred to as an O3' type crystal structure or a pseudo-spinel crystal structure in this specification and the like. Accordingly, the O3' type crystal structure may be rephrased as the pseudo-spinel crystal structure. Note that although the indication of lithium is omitted in the diagram of the O3' type crystal structure shown in FIG. 6 to explain the symmetry of cobalt atoms and the symmetry of oxygen atoms, a lithium of 20 atomic % or less, for example, with respect to cobalt practically exists between the $CoO_2$ layers. In addition, in both the O3 type crystal structure and the O3' type crystal structure, a slight amount of magnesium preferably exists between the $CoO_2$ layers, i.e., in lithium sites. In addition, a slight amount of halogen such as fluorine preferably exists in oxygen sites at random.

Note that in the O3' type crystal structure, a light element such as lithium is sometimes coordinated to four oxygen atoms. Also in that case, the ion arrangement has symmetry similar to that of the spinel crystal structure.

The O3' type crystal structure can also be regarded as a crystal structure that contains Li between layers at random but is similar to a $CdCl_2$ type crystal structure. The crystal structure similar to the $CdCl_2$ type crystal structure is close to a crystal structure of lithium nickel oxide when charged up to a charge depth of 0.94 ($Li_{0.06}NiO_2$); however, pure lithium cobalt oxide or a layered rock-salt positive electrode active material containing a large amount of cobalt is known not to have this crystal structure in general.

In the positive electrode active material 200A of one embodiment of the present invention, a change in the crystal structure when high-voltage charge is performed and a large amount of lithium is released is inhibited as compared with a conventional positive electrode active material. As shown by dotted lines in FIG. 6, for example, $CoO_2$ layers hardly deviate in the crystal structures.

More specifically, the structure of the positive electrode active material 200A of one embodiment of the present invention is highly stable even when a charge voltage is high. For example, at charge voltage that makes the conventional positive electrode active material have the H1-3 type crystal structure, for example, at a voltage of approximately 4.6 V with reference to the potential of lithium metal, there is a charge voltage region where the positive electrode active material can maintain the R-3m (O3) crystal structure. Moreover, in a higher charge voltage region, for example, at voltages of approximately 4.65 V to 4.7 V with reference to the potential of lithium metal, there is a region within which the O3' type crystal structure can be obtained. At a much higher charge voltage, the H1-3 type crystal is eventually observed in some cases. In the case where graphite, for instance, is used as a negative electrode active material in a secondary battery, a charge voltage region where the R-3m (O3) crystal structure can be maintained exists when the voltage of the secondary battery is, for example, higher than or equal to 4.3 V and lower than or equal to 4.5 V. In a higher charge voltage region, for example, at a voltage higher than or equal to 4.35 V and lower than or equal to 4.55 V with reference to the potential of a lithium metal, there is a region within which the O3' type crystal structure can be obtained.

Thus, in the positive electrode active material 200A of one embodiment of the present invention, the crystal structure is less likely to be disordered even when charge and discharge are repeated at high voltage.

In addition, in the positive electrode active material 200A, a difference in the volume per unit cell between the O3-type crystal structure with a charge depth of 0 and the O3' type crystal structure with a charge depth of 0.8 is less than or equal to 2.5%, specifically, less than or equal to 2.2%.

In the unit cell of the O3' type crystal structure, coordinates of cobalt and oxygen can be represented by Co (0, 0, 0.5) and O (0, 0, x) within the range of $0.20 \le x \le 0.25$.

A slight amount of an additive, e.g., magnesium, existing between the $CoO_2$ layers, i.e., in lithium sites at random, has an effect of inhibiting a deviation in the $CoO_2$ layers. Thus, when magnesium exists between the $CoO_2$ layers, the $O_3$' type crystal structure is likely to be formed. Therefore, magnesium is preferably distributed over whole particles of the positive electrode active material 200A of one embodiment of the present invention. In addition, to distribute magnesium over whole particles, heat treatment is preferably performed in the production process of the positive electrode active material 200A of one embodiment of the present invention.

However, cation mixing occurs when the heat treatment temperature is excessively high, so that the additive, e.g., magnesium, is highly likely to enter the cobalt sites. Magnesium in the cobalt sites does not have the effect of maintaining the R-3m structure in high-voltage charging. Furthermore, when the heat treatment temperature is excessively high, adverse effects such as reduction of cobalt to have a valence of two and transpiration of lithium are concerned.

In view of the above, a halogen compound such as a fluorine compound is preferably added to lithium cobalt oxide before the heat treatment for distributing magnesium over whole particles. The addition of the halogen compound depresses the melting point of lithium cobalt oxide. The depression of the melting point makes it easier to distribute magnesium over whole particles at a temperature at which the cation mixing is unlikely to occur. Furthermore, it is expected that the existence of the fluorine compound can improve corrosion resistance to hydrofluoric acid generated by decomposition of an electrolyte solution.

When the magnesium concentration is higher than a predetermined value, the effect of stabilizing a crystal structure becomes small in some cases. This is probably because magnesium enters the cobalt sites in addition to the lithium sites. The number of magnesium atoms in the positive electrode active material of one embodiment of the present invention is preferably 0.001 to 0.1 times, preferably larger than 0.01 times and less than 0.04 times, still further preferably approximately 0.02 times the number of atoms of transition metal. The magnesium concentration described here may be a value obtained by element analysis on the entire particles of the positive electrode active material using ICP-MS or the like, or may be a value based on the ratio of the raw materials mixed in the production process of the positive electrode active material, for example.

To lithium cobalt oxide, as a metal other than cobalt (hereinafter, a metal Z), one or more metals selected from nickel, aluminum, manganese, titanium, vanadium, and chromium may be added, for example, and in particular, at least one of nickel and aluminum is preferably added. In some cases, manganese, titanium, vanadium, and chromium are likely to have a valence of four stably and thus contribute highly to a stable structure. The addition of the metal Z may enable the positive electrode active material of one embodiment of the present invention to have a more stable crystal structure in high-voltage charge, for example. Here, in the positive electrode active material of one embodiment of the present invention, the metal Z is preferably added at a concentration at which the crystallinity of the lithium cobalt oxide is not greatly changed. For example, the metal Z is preferably added at an amount with which the aforementioned Jahn-Teller effect is not exhibited.

As shown in the legend in FIG. 6, aluminum and transition metals typified by nickel and manganese preferably exist in cobalt sites, but some of them may exist in lithium sites. Magnesium preferably exists in lithium sites. Fluorine may be substituted for part of oxygen.

As the magnesium concentration in the positive electrode active material of one embodiment of the present invention increases, the capacity of the positive electrode active material decreases in some cases. As an example, one possible reason is that the amount of lithium that contributes to charge and discharge decreases when magnesium enters the lithium sites. Furthermore, excess magnesium sometimes generates a magnesium compound that does not contribute to charge and discharge. When the positive electrode active material of one embodiment of the present invention contains nickel as the metal Z in addition to magnesium, the capacity per weight and per volume can be increased in some cases. When the positive electrode active material of one embodiment of the present invention contains aluminum as the metal Z in addition to magnesium, the capacity per weight and per volume can be increased in some cases. When the positive electrode active material of one embodiment of the present invention contains nickel and aluminum in addition to magnesium, the capacity per weight and per volume can be increased in some cases.

The concentrations of the elements, such as magnesium and the metal Z, contained in the positive electrode active material of one embodiment of the present invention are described below using the number of atoms.

The number of nickel atoms in the positive electrode active material of one embodiment of the present invention is preferably 10% or less, further preferably 7.5% or less, still further preferably 0.05% or more and 4% or less, yet still further preferably 0.1% or more and 2% or less of the number of cobalt atoms. The nickel concentration described here may be a value obtained by element analysis on the entire particle of the positive electrode active material using ICP-MS or the like, or may be a value based on the ratio of the raw materials mixed in the production process of the positive electrode active material, for example.

When a state being charged with high voltage is held for a long time, the transition metal dissolves in an electrolyte solution from the positive electrode active material, and the crystal structure might be broken. However, when nickel is included at the above-described proportion, dissolution of the transition metal from a positive electrode active material 200A can be inhibited in some cases.

The number of aluminum atoms in the positive electrode active material of one embodiment of the present invention is preferably 0.05% or more and 4%, further preferably 0.1% or more and 2% or less of the number of cobalt atoms. The aluminum concentration described here may be a value obtained by element analysis on the entire particle of the positive electrode active material using ICP-MS or the like, or may be a value based on the ratio of the raw materials mixed in the process of producing the positive electrode active material, for example.

It is preferable that the positive electrode active material of one embodiment of the present invention include an element X, and phosphorus be used as the element X. The positive electrode active material of one embodiment of the present invention further preferably includes a compound including phosphorus and oxygen.

When the positive electrode active material of one embodiment of the present invention includes a compound including the element X, a short circuit is less likely to occur while the high-voltage charged state is maintained in some cases.

When the positive electrode active material of one embodiment of the present invention contains phosphorus as the element X, phosphorus may react with hydrogen fluoride generated by the decomposition of the electrolyte solution, which might decrease the hydrogen fluoride concentration in the electrolyte solution.

In the case where the electrolyte solution contains $LiPF_6$, hydrogen fluoride may be generated by hydrolysis. In some cases, hydrogen fluoride is generated by the reaction of PVDF used as a component of the positive electrode and alkali. The decrease in hydrogen fluoride concentration in the electrolyte solution can inhibit corrosion and/or coating film separation of a current collector in some cases. Furthermore, the decrease in hydrogen fluoride concentration in the electrolyte solution can inhibit a reduction in adhesion properties due to gelling and/or insolubilization of PVDF in some cases.

When containing magnesium in addition to the element X, the positive electrode active material of one embodiment of the present invention is extremely stable in the high-voltage charged state. When the element X is phosphorus, the number of phosphorus atoms is preferably 1% or more and 20% or less, further preferably 2% or more and 10% or less, still further preferably 3% or more and 8% or less of the number of cobalt atoms. In addition, the number of magnesium atoms is preferably 0.1% or more and 10% or less, further preferably 0.5% or more and 5% or less, still further preferably 0.7% or more and 4% or less of the number of cobalt atoms. The phosphorus concentration and the magnesium concentration described here may each be a value obtained by element analysis on the entire particle of the positive electrode active material using ICP-MS or the like, or may be a value based on the ratio of the raw materials mixed in the process of producing the positive electrode active material, for example.

In the case where the positive electrode active material has a crack, phosphorus, more specifically, a compound containing phosphorus and oxygen, in the inner portion of the crack may inhibit crack development, for example.

The oxygen atoms indicated by arrows in FIG. 6 reveal a slight difference in the symmetry of oxygen atoms between the O3-type crystal structure and the O3' type crystal structure. Specifically, the oxygen atoms in the O3-type crystal structure are aligned with the dotted line, whereas strict alignment of the oxygen atoms is not observed in the O3' type crystal structure. This is caused by an increase in the amount of tetravalent cobalt along with a decrease in the amount of lithium in the O3' type crystal structure, resulting in an increase in the Jahn-Teller distortion. Consequently, the octahedral structure of $CoO_6$ is distorted. In addition, repelling of oxygen atoms in the $CoO_2$ layer becomes stronger along with a decrease in the amount of lithium, which also affects the difference in symmetry of oxygen atoms.

<<Surface Portion>>

Magnesium is preferably distributed over whole particles of the positive electrode active material 200A of one embodiment of the present invention, and further preferably, the magnesium concentration in the surface portion of the particle is higher than the average in whole particles. For example, the magnesium concentration in the surface portion of the particle that is measured by XPS or the like is preferably higher than the average magnesium concentration in whole particles measured by ICP-MS or the like.

In the case where the positive electrode active material 200A of one embodiment of the present invention contains an element other than cobalt, for example, one or more metals selected from nickel, aluminum, manganese, iron, and chromium, the concentration of the metal(s) in the vicinity of the surface portion of the particle is preferably higher than the average concentration of the metal(s) in the whole particle. For example, the concentration of the element other than cobalt in the surface portion of the particle measured by XPS or the like is preferably higher than the average concentration of the element in the whole particle measured by ICP-MS or the like.

The surface of the particle is a kind of crystal defects and lithium is extracted from the surface during charging; thus, the lithium concentration in the surface of the particle tends to be lower than that inside the particle. Therefore, the surface of the particle tends to be unstable and its crystal structure is likely to break. The higher the magnesium concentration in the surface portion is, the more effectively the change in the crystal structure can be inhibited. In addition, when a magnesium concentration in the surface portion is high, it is expected that the corrosion resistance to hydrofluoric acid generated by the decomposition of the electrolyte solution is improved.

In addition, the concentration of halogen such as fluorine in the surface portion of the positive electrode active material 200A of one embodiment of the present invention is preferably higher than the average concentration of halogen such as fluorine in whole particles. When halogen exists in the surface portion that is a region in contact with an electrolyte solution, the corrosion resistance to hydrofluoric acid can be effectively improved.

In this manner, the surface portion of the positive electrode active material 200A of one embodiment of the present invention preferably has higher concentrations of additives such as magnesium and fluorine than those in the inner portion and a composition different from that in the inner portion. In addition, the composition preferably has a crystal structure stable at normal temperature. Thus, the surface portion may have a crystal structure different from that of the inner portion. For example, at least part of the surface portion of the positive electrode active material 200A of one embodiment of the present invention may have a rock-salt crystal structure. Furthermore, in the case where the surface portion and the inner portion have different crystal structures, the orientations of crystals in the surface portion and the inner portion are preferably substantially aligned.

Anions of a layered rock-salt crystal and anions of a rock-salt crystal have a cubic close-packed structure (face-centered cubic lattice structure). Anions of O3' type crystal are also presumed to have a cubic close-packed structure. When the O3' type crystal is in contact with the layered rock-salt crystal and the rock-salt crystal, there is a crystal plane at which orientations of cubic close-packed structures composed of anions are aligned. Note that a space group of the layered rock-salt crystal and the O3' type crystal is R-3m, which is different from a space group Fm-3m of a rock-salt crystal (a space group of a general rock-salt crystal) and a space group Fd-3m of a rock-salt crystal (a space group of a rock-salt crystal having the simplest symmetry); thus, the Miller index of the crystal plane satisfying the above conditions in the layered rock-salt crystal and the O3' type crystal is different from that in the rock-salt crystal. In this specification, a state where the orientations of the cubic close-packed structures composed of anions in the layered rock-salt crystal, the O3' type crystal, and the rock-salt crystal are aligned is sometimes referred to as a state where crystal orientations are substantially aligned.

Whether the crystal orientations in two regions are substantially aligned with each other can be judged from a TEM (transmission electron microscope) image, a STEM (scanning transmission electron microscope) image, a HAADF-STEM (high-angle annular dark field scanning transmission electron microscope) image, an ABF-STEM (annular bright-field scanning transmission electron microscope) image, and the like. X-ray diffraction (XRD), electron diffraction, neutron diffraction, and the like can also be used for judging. When the crystal orientations are substantially aligned with each other, a state where an angle between the orientations of lines in each of which cations and anions are alternately arranged is less than or equal to 5°, preferably less than or equal to 2.5° is observed from a TEM image and the like. Note that in a TEM image and the like, a light element typified by oxygen or fluorine cannot be clearly observed in some cases; in such a case, alignment of orientations can be judged by arrangement of metal elements.

Only with the structure where the surface portion includes only MgO or MgO and CoO(II) forms a solid solution, it is difficult to insert and extract lithium. Thus, the surface portion should contain at least cobalt, and further contain lithium in the discharged state to have a path through which lithium is inserted and extracted. In addition, the concentration of cobalt is preferably higher than that of magnesium.

The element X is preferably positioned in f the surface of the particle in the positive electrode active material 200A of one embodiment of the present invention. For example, the positive electrode active material 200A of one embodiment of the present invention may be covered with a coating film containing the element X.

<Analysis Method>

Whether or not a positive electrode active material is the positive electrode active material 200A of one embodiment of the present invention that has an O3' type crystal structure when charged with high voltage can be determined by analyzing a high-voltage charged positive electrode using XRD, electron diffraction, neutron diffraction, electron spin resonance (ESR), nuclear magnetic resonance (NMR), or the like. The XRD is particularly preferable because the symmetry of a transition metal such as cobalt contained in the positive electrode active material can be analyzed with high resolution, the degrees of crystallinity and the crystal orientations can be compared, the distortion of lattice periodicity and the crystallite size can be analyzed, and a positive electrode obtained by disassembling a secondary battery can be measured without any change with sufficient accuracy, for example.

As described so far, the positive electrode active material 200A of one embodiment of the present invention has a feature of a small change in the crystal structure between the high-voltage charged state and the discharged state. A material where 50 wt % or more of the crystal structure largely changes between the high-voltage charged state and the discharged state is not preferable because the material cannot withstand the high-voltage charge and discharge. In addition, it should be noted that an objective crystal structure is not obtained in some cases only by addition of additive elements. For example, although the positive electrode active material that is lithium cobalt oxide containing magnesium and fluorine is a commonality, the positive electrode active material has 60 wt % or more of the O3' type crystal structure in some cases, and has 50 wt % or more of the H1-3 type crystal structure in other cases, when charged with high voltage. Furthermore, at a predetermined voltage, the positive electrode active material has almost 100 wt % of the O3' type crystal structure, and with an increase in the predetermined voltage, the H1-3 type crystal structure is generated in some cases. Thus, analysis of the crystal structure, including XRD, is needed to determine whether or not the positive electrode active material is the positive electrode active material 200A of one embodiment of the present invention.

Note that a positive electrode active material in the high-voltage charged state or the discharged state sometimes causes a change in the crystal structure when exposed to air. For example, the O3' type crystal structure changes into the H1-3 type crystal structure in some cases. Thus, all samples are preferably handled in an inert atmosphere such as an argon atmosphere.

<<XRD>>

Figure 7:
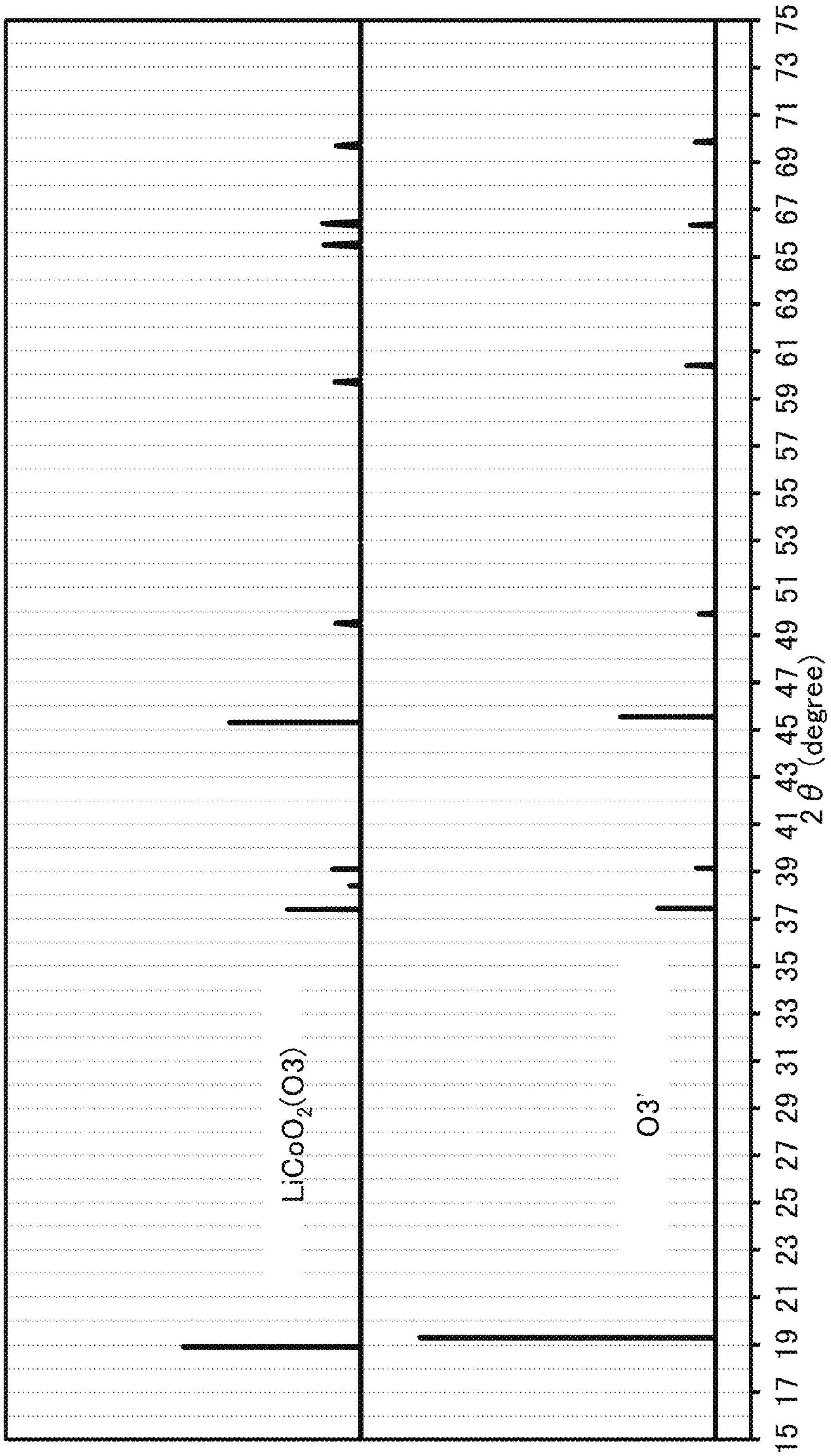
FIG. 7 shows XRD patterns calculated from crystal structures.
Figure 9:
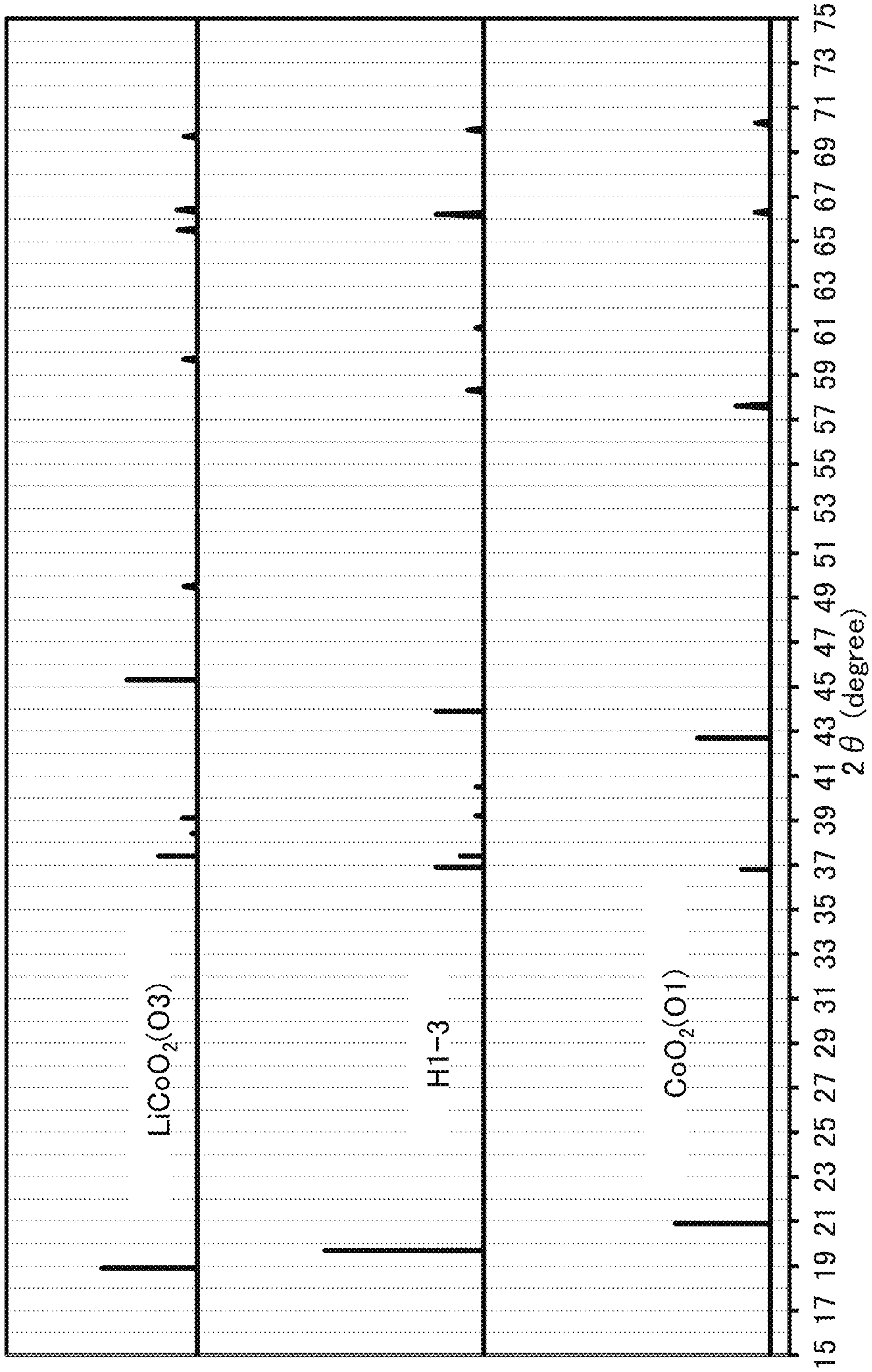
FIG. 9 shows XRD patterns calculated from crystal structures.

FIG. 7 and FIG. 9 show ideal powder XRD patterns with CuKα1 rays that are calculated from models of an O3' type crystal structure and an H1-3 type crystal structure. For comparison, ideal XRD patterns calculated from the crystal structures of $LiCoO_2$ (O3) with a charge depth of 0 and $CoO_2$ (O1) with a charge depth of 1 are also shown. Note that the patterns of $LiCoO_2$ (O3) and $CoO_2$ ($O_1$) were made from crystal structure data obtained from ICSD (Inorganic Crystal Structure Database) (see Non-Patent Document 5) using Reflex Powder Diffraction, which is a module of Materials Studio (BIOVIA). The range of 2θ was from 15° to 75°, Step size was 0.01, the wavelength λ1 was $1.540562\times10^{-10}$ m, λ2 was not set, and Monochromator was a single monochromator. The pattern of the H1-3 type crystal structure was made from the crystal structure data described in Non-Patent Document 3 in a similar manner. The pattern of the O3' type crystal structure was estimated from the XRD pattern of the positive electrode active material of one embodiment of the present invention, the crystal structure was fitted with TOPAS ver. 3 (crystal structure analysis software manufactured by Bruker Corporation), and XRD patterns were made in a manner similar to those of other structures.

As shown in FIG. 7, in the O3' type crystal structure, diffraction peaks appear at 219 (degree) of 19.30±0.20° (greater than or equal to 19.10° and less than or equal to 19.50°) and 2θ of 45.55±0.10° (greater than or equal to 45.45° and less than or equal to 45.65°). More specifically, sharp diffraction peaks appear at 2θ of 19.30±0.10° (greater than or equal to 19.20° and less than or equal to 19.40°) and 2θ of 45.55±0.05° (greater than or equal to 45.50° and less than or equal to 45.60°). However, as shown in FIG. 9, the H1-3 type crystal structure and $CoO_2$ (P-3m1, O1) do not exhibit peaks at these positions. Thus, the peaks at 2θ (degree) of 19.30±0.20° and 2θ of 45.55±0.10° in the high-voltage charged state can be the features of the positive electrode active material 200A of one embodiment of the present invention.

It other words, the positions where the XRD diffraction peaks appear are close in the crystal structure with a charge depth of 0 and the crystal structure in the high-voltage charged state. More specifically, a difference in the positions of two or more, further preferably three or more of the main diffraction peaks between both of the crystal structures, at 2θ, is less than or equal to 0.7, further preferably less than or equal to 0.5.

Note that although the positive electrode active material 200A of one embodiment of the present invention has the O3' type crystal structure when being charged with high voltage, not all the particles necessarily have the O3' type crystal structure. The positive electrode active material 200A may include another crystal structure or may be partly amorphous. Note that when the XRD patterns are analyzed by the Rietveld analysis, the O3' type crystal structure preferably accounts for more than or equal to 50 wt %, further preferably more than or equal to 60 wt %, and still further preferably more than or equal to 66 wt %. The positive electrode active material in which the O3' type crystal structure accounts for more than or equal to 50 wt %, further preferably more than or equal to 60 wt %, still further preferably more than or equal to 66 wt % can have sufficiently good cycle performance.

Furthermore, even after 100 or more cycles of charging and discharging, the O3' type crystal structure preferably accounts for more than or equal to 35 wt %, further preferably more than or equal to 40 wt %, still further preferably more than or equal to 43 wt % when the Rietveld analysis is performed.

The crystallite size of the O3' type crystal structure included in the positive electrode active material particle does not decrease to less than approximately one-tenth that of $LiCoO_2$ (O3) in the discharged state. Thus, a clear peak of the O3' type crystal structure can be observed after the high-voltage charge even under the same XRD measurement conditions as those of a positive electrode before the charge and discharge. In contrast, simple $LiCoO_2$ has a small crystallite size and a broad small peak even when it can have a structure part of which is similar to the O3' type crystal structure. The crystallite size can be calculated from the half width of the XRD peak.

The influence of the Jahn-Teller effect is preferably small in the positive electrode active material of one embodiment of the present invention. It is preferable that the positive electrode active material of one embodiment of the present invention have a layered rock-salt crystal structure and mainly contain cobalt as a transition metal. The positive electrode active material of one embodiment of the present invention may contain the above-described the metal Z in addition to cobalt as long as the influence of the Jahn-Teller effect is small.

The range of the lattice constant where the influence of the Jahn-Teller effect is presumed to be small in the positive electrode active material is examined by XRD analysis.

Alternatively, when the layered rock-salt crystal structure of the particle of the positive electrode active material in the discharged state or the state where charge and discharge are not performed is subjected to XRD analysis, a first peak is observed at 2θ of 18.50° or greater and 19.30° or less, and a second peak is observed at 2θ of 38.00° or greater and 38.80° or less, in some cases.

Note that the peaks appearing in the powder XRD patterns reflect the crystal structure of the inner portion of the positive electrode active material 200A, which accounts for the majority of the volume of the positive electrode active material 200A. The crystal structure of the surface portion 200A or the like can be analyzed by electron diffraction of a cross section of the positive electrode active material 200A, for example.

The structure of the positive electrode active material is not limited to the above-described structure. Even when the positive electrode active material includes neither nickel nor aluminum, the combination of such a positive electrode active material with an electrolyte solution and an additive enables a significant effect to be produced.

Another example of production of the positive electrode active material is described below with use of a production flow chart shown in FIG. 5.

Figure 5:
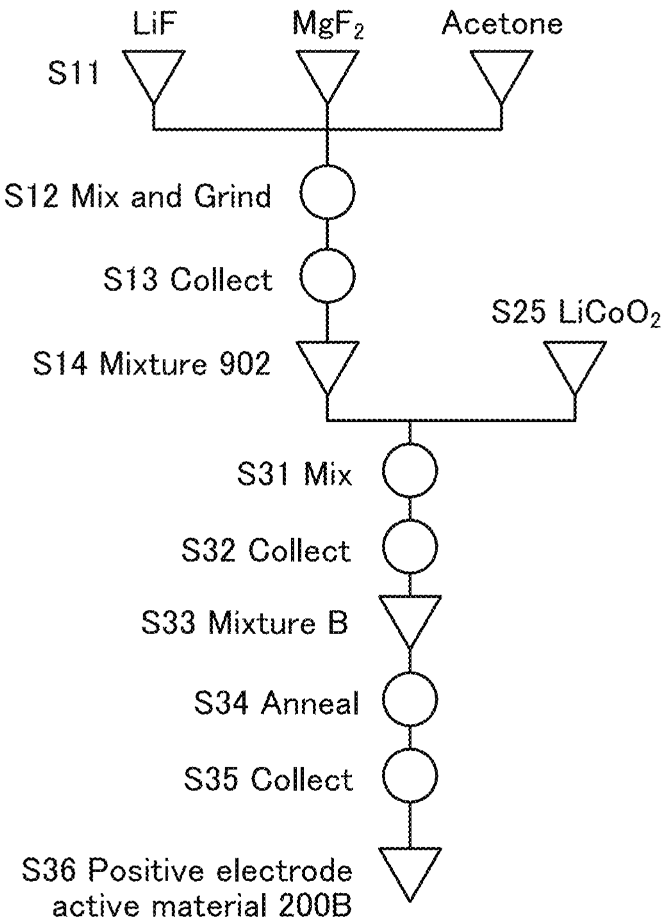
FIG. 5 is an example of a flow chart for producing a positive electrode active material showing one embodiment of the present invention.

As shown in Step S11 in FIG. 5, lithium fluoride that is a fluorine source and magnesium fluoride that is a magnesium source are first prepared as materials of the mixture 902. Among them, lithium fluoride, which has a relatively low melting point of 848° C., is preferable because it is easily melted in an annealing process described later. Lithium fluoride can be used as both the lithium source and the fluorine source. Magnesium fluoride can be used as both the fluorine source and the magnesium source.

In FIG. 5, lithium fluoride LiF is prepared as the fluorine source and the lithium source, and magnesium fluoride $MgF_2$ is prepared as the fluorine source and the magnesium source (Step S11 in FIG. 5). The molar ratio of lithium fluoride LiF to magnesium fluoride $MgF_2$ is preferably $LiF:MgF_2=x:1$ ($0 \le x \le 1.9$), further preferably $LiF:MgF_2=x:1$ ($0.1 \le x \le 0.5$), still further preferably $LiF:MgF_2=x:1$ (x=the vicinity of 0.33).

In addition, in the case where the following mixing and grinding step is performed by a wet process, a solvent is prepared. As the solvent, ketone such as acetone; alcohol such as ethanol or isopropanol; ether; dioxane; acetonitrile; N-methyl-2-pyrrolidone (NMP); or the like can be used. An aprotic solvent that hardly reacts with lithium is further preferably used. In this embodiment, acetone is used (see Step S11 in FIG. 5).

Next, the materials of the mixture 902 are mixed and ground (Step S12 in FIG. 5). Although the mixing can be performed by a dry process or a wet process, the wet process is preferable because the materials can be ground to a smaller size. For example, a ball mill, a bead mill, or the like can be used for the mixing. When the ball mill is used, a zirconia ball can be used as media, for example. The mixing and grinding steps are preferably performed sufficiently to pulverize the mixture 902.

The materials mixed and ground in the above manner are collected (Step S13 in FIG. 5), whereby the mixture 902 is obtained (Step S14 in FIG. 5).

For example, the D50 of the mixture 902 is preferably greater than or equal to 600 nm and less than or equal to 20 μm, further preferably greater than or equal to 1 μm and less than or equal to 10 μm. When mixed with a composite oxide including lithium, a transition metal, and oxygen in a later step, the mixture 902 pulverized to such a small size is easily attached to surfaces of composite oxide particles uniformly. The mixture 902 is preferably attached to the surfaces of the composite oxide particles uniformly because both halogen and magnesium are easily distributed to the surface portion of the composite oxide particles after heating. When there is a region containing neither halogen nor magnesium in the surface portion, the above-described O3' type crystal structure might be unlikely to be obtained in a charged state.

Next, a lithium source is prepared as shown in Step S25 in FIG. 5. A composite oxide which is synthesized in advance and contains lithium, a transition metal, and oxygen is used for Step S25.

For example, as lithium cobalt oxide synthesized in advance, a lithium cobalt oxide particle (product name: CELLSEED C-10N) formed by NIPPON CHEMICAL INDUSTRIAL CO., LTD. can be used. This is lithium cobalt oxide in which the average particle diameter (D50) is approximately 12 μm, and in the impurity analysis by a glow discharge mass spectroscopy method (GD-MS), the magnesium concentration and the fluorine concentration are less than or equal to 50 ppm wt, the calcium concentration, the aluminum concentration, and the silicon concentration are less than or equal to 100 ppm wt, the nickel concentration is less than or equal to 150 ppm wt, the sulfur concentration is less than or equal to 500 ppm wt, the arsenic concentration is less than or equal to 1100 ppm wt, and the concentrations of elements other than lithium, cobalt, and oxygen are less than or equal to 150 ppm wt.

The composite oxide containing lithium, the transition metal, and oxygen in Step S25 preferably has a layered rock-salt crystal structure with few defects and distortions. Therefore, the composite oxide is preferably a composite oxide with few impurities. In the case where the composite oxide containing lithium, the transition metal, and oxygen includes a large number of impurities, the crystal structure is highly likely to have a large number of defects or distortions.

Next, the mixture 902 and the composite oxide containing lithium, the transition metal, and oxygen are mixed (Step S31 in FIG. 5). The atomic ratio of the transition metal TM in the composite oxide containing lithium, the transition metal, and oxygen to magnesium MgMix1 contained in the mixture 902 is preferably TM:MgMix1=1:y ($0.005 \leq y \leq 0.05$), further preferably TM:$Mg_{Mix1}$=1:y ($0.007 \leq y \leq 0.04$), still further preferably approximately TM:$Mg_{Mix1}$=1:0.02.

The condition of the mixing in Step S31 is preferably milder than that of the mixing in Step S12 in order not to damage the particles of the composite oxide. For example, a condition with a lower rotation frequency or shorter time than the mixing in Step S12 is preferable. In addition, it can be said that the dry process has a milder condition than the wet process. For example, a ball mill, a bead mill, or the like can be used for the mixing. When the ball mill is used, a zirconia ball can be used as media, for example.

The materials mixed in the above manner are collected (Step S32 in FIG. 5), whereby a mixture B is obtained (Step S33 in FIG. 5).

Next, the mixture B is heated (Step S34 in FIG. 5).

The annealing is preferably performed at an appropriate temperature for an appropriate time. The appropriate temperature and time depend on the conditions such as the particle size and the composition of the composite oxide containing lithium, the transition metal, and oxygen in Step S25. In the case where the particle size is small, the annealing is preferably performed at a lower temperature or for a shorter time than the case where the particle size is large, in some cases.

When the average particle diameter (D50) of the particles in Step S25 is approximately 12 μm, for example, the annealing temperature is preferably higher than or equal to 600° C. and lower than or equal to 950° C., for example. The annealing time is preferably longer than or equal to 3 hours, further preferably longer than or equal to 10 hours, still further preferably longer than or equal to 60 hours, for example.

When the average particle diameter (D50) of the particles in Step S25 is approximately 5 μm, the annealing temperature is preferably higher than or equal to 600° C. and lower than or equal to 950° C., for example. The annealing time is preferably longer than or equal to 1 hour and shorter than or equal to 10 hours, further preferably approximately 2 hours, for example.

The temperature decreasing time after the annealing is, for example, preferably longer than or equal to 10 hours and shorter than or equal to 50 hours.

It is considered that when the mixture B is annealed, a material having a low melting point (e.g., lithium fluoride, which has a melting point of 848° C.) in the mixture is melted first and distributed to the surface portion of the composite oxide particle. Next, the existence of the melted material decreases the melting points of other materials, presumably resulting in melting of the other materials. For example, magnesium fluoride (melting point: 1263° C.) is presumably melted and distributed to the surface portion of the composite oxide particle.

The elements included in the mixture B are diffused faster in the surface portion and the vicinity of the grain boundary than inside the composite oxide particle. Therefore, magnesium and halogen are higher in concentration in the surface portion and the vicinity of the grain boundaries than in the inner portion. As described later, the higher the magnesium concentration in the surface portion and the vicinity of the grain boundaries is, the more effectively the change in the crystal structure can be inhibited.

The materials annealed in the above manner are collected (Step S35 in FIG. 5), whereby a positive electrode active material 200B is obtained (Step S36 in FIG. 5).

A secondary battery using the positive electrode active material 200B obtained in the above manner is excellent in cycle characteristics.

This embodiment can be freely combined with Embodiment 1 or Embodiment 2.

Embodiment 4

In this embodiment, an example partly different from Embodiment 1 or Embodiment 2 will be described.

Embodiment 1 shows the example in which the buffer layer is an aggregate of particles, and Embodiment 2 shows the example in which the buffer layer is formed on surfaces of current collector particles. In contrast, this embodiment shows an example in which a buffer layer is formed in a film form on current collector particles.

Figure 10:
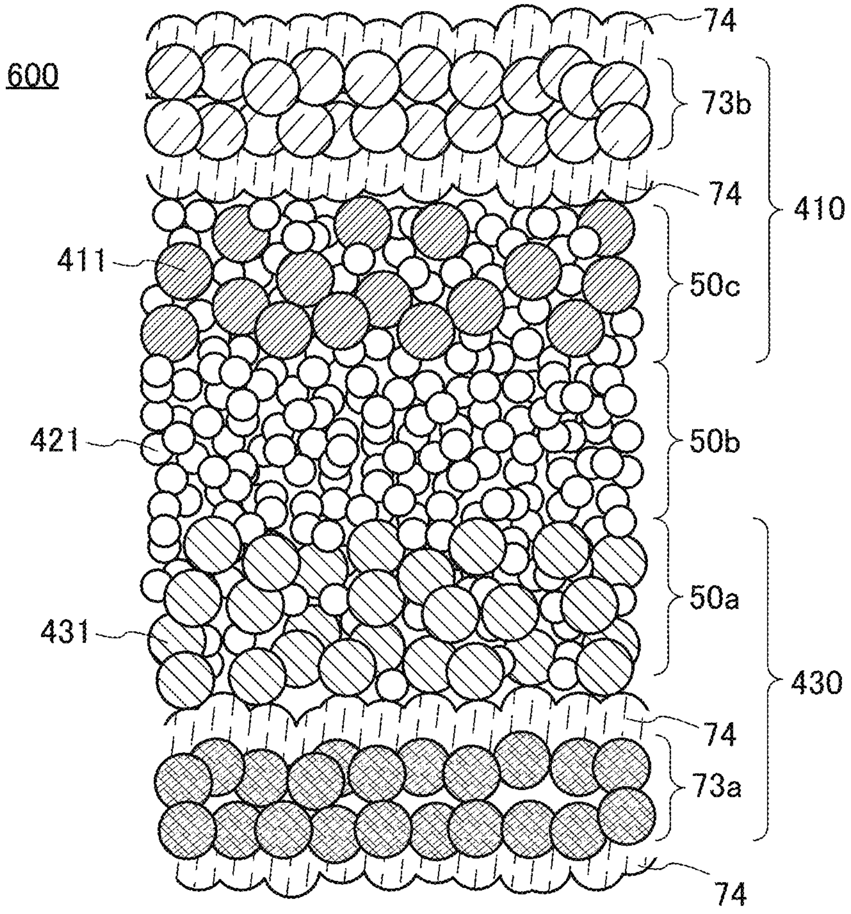
FIG. 10 is an enlarged schematic cross-sectional view illustrating part of a secondary battery showing one embodiment of the present invention.

FIG. 10 illustrates part of a structure of a secondary battery 600 in this embodiment.

FIG. 10 is different from FIG. 2 in that the buffer layer 74 is formed in a film form on the positive electrode current collector layer 73*a*. Furthermore, the buffer layer 74 is also formed in a film form on the negative electrode current collector layer 73*b*. A film form of the buffer layer 74 enables its surface area to be increased, which makes a contact area increased. Thus, such a form brings about an effect of reducing the internal resistance of a secondary battery.

The buffer layer 74 can be formed, for example, by a sputtering method, a chemical vapor deposition (CVD) method, a molecular beam epitaxy (MBE) method, a pulsed laser deposition (PLD) method, an atomic layer deposition (ALD) method, or the like.

Note that although the example illustrated in FIG. 10 has a structure in which the buffer layer 74 is formed to cover the positive electrode current collector layer 73*a* and the negative electrode current collector layer 73*b*, one embodiment of the present invention is not limited thereto. For example, the buffer layer 74 is preferably formed to cover part of the positive electrode current collector layer 73*a* or at least part of the negative electrode current collector layer 73*b*.

The schematic cross-sectional view of the secondary battery 600 is the same as that in FIG. 1B; therefore, the description thereof is omitted here. Note that portions that are the same as those in FIG. 1B are denoted by the same reference numerals. FIG. 10 corresponds to an enlarged view of a portion indicated by the dotted line in FIG. 1B.

In addition, this embodiment can be freely combined with Embodiment 1.

Embodiment 5

In this embodiment, application examples of a secondary battery relating to one embodiment of the present invention will be described.

The secondary battery of one embodiment of the present invention can be used, for example, as power supplies or auxiliary power supplies of a variety of electronic devices (e.g., information terminals, computers, smartphones, e-book readers, digital still cameras, video cameras, video recording/reproducing devices, navigation systems, and game machines). The secondary battery of one embodiment of the present invention can also be used for image sensors, IoT (Internet of Things) terminal devices, healthcare devices, and the like. Here, the computers refer not only to tablet computers, notebook computers, and desktop computers, but also to large computers such as server systems.

Examples of an electronic device including the secondary battery of one embodiment of the present invention will be described. FIG. 12A to FIG. 12I illustrate electronic devices each of which includes an electronic component 4700 including the secondary battery. The secondary battery of one embodiment of the present invention has high discharge capacity, high cycle performance, and a high level of safety. Such a secondary battery can be favorably used in electronic devices given below. The secondary battery can be favorably used particularly in electronic devices that are required to have durability.

[Mobile Phone]

Figure 12A:
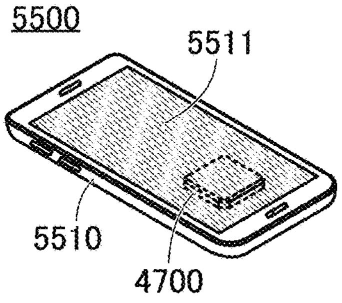
FIG. 12A to FIG. 12J are each a perspective view or a schematic view illustrating an example of an electronic device.

An information terminal 5500 illustrated in FIG. 12A is a mobile phone (a smartphone), which is a type of portable information terminal. The information terminal 5500 includes a housing 5510 and a display portion 5511, and as input interfaces, a touch panel is provided in the display portion 5511 and a button is provided in the housing 5510.

[Wearable Terminal]

Figure 12B:
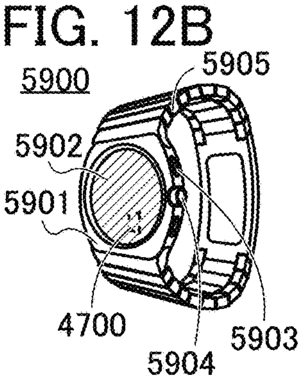

FIG. 12B illustrates an information terminal 5900 that is an example of a wearable terminal. The information terminal 5900 includes a housing 5901, a display portion 5902, an operation switch 5903, an operation switch 5904, a band 5905, and the like.

[Information Terminal]

Figure 12C:
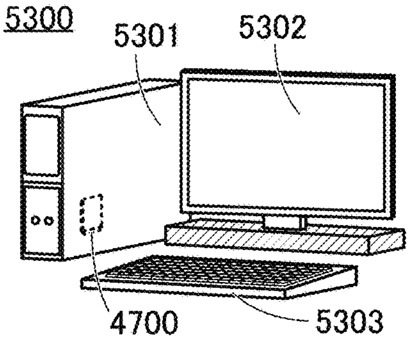

FIG. 12C illustrates a desktop information terminal 5300. The desktop information terminal 5300 includes a main body 5301 of the information terminal, a display portion 5302, and a keyboard 5303.

Note that although FIG. 12A to FIG. 12C illustrate a smartphone, a wearable terminal, and a desktop information terminal as examples of the electronic device, one embodiment of the present invention can also be applied to an information terminal other than a smartphone, a wearable terminal, and a desktop information terminal. Examples of information terminals other than a smartphone, a wearable terminal, and a desktop information terminal include a PDA (Personal Digital Assistant), a notebook information terminal, and a workstation.

[Household Appliance]

Figure 12D:
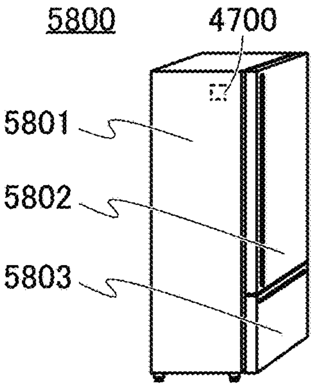

FIG. 12D illustrates an electric refrigerator-freezer 5800 as an example of a household appliance. The electric refrigerator-freezer 5800 includes a housing 5801, a refrigerator door 5802, a freezer door 5803, and the like. For example, the electric refrigerator-freezer 5800 is compatible with the IoT (Internet of Things).

The secondary battery of one embodiment of the present invention can be used for the auxiliary power supply of the electric refrigerator-freezer 5800. The electric refrigerator-freezer 5800 can transmit and receive data on food stored in the electric refrigerator-freezer 5800 and food expiration dates, for example, to/from an information terminal and the like via the Internet or the like. When a secondary battery of one embodiment of the present invention is applied to the auxiliary power supply, the internal temperature at the time of power failure, or the like, can be retained.

An electric refrigerator-freezer is described in this embodiment as a household appliance; other examples of household appliances include a vacuum, a microwave oven, an electric oven, a rice cooker, a water heater, an IH cooker, a water server, a heating-cooling combination appliance such as an air conditioner, a washing machine, a drying machine, and an audio visual appliance.

[Game Machines]

Figure 12E:
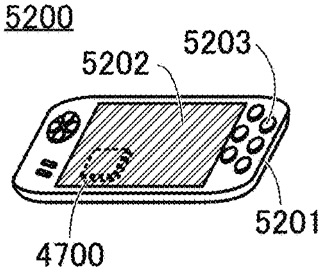

FIG. 12E illustrates a portable game machine 5200 that is an example of a game machine. The portable game machine 5200 includes a housing 5201, a display portion 5202, a button 5203, and the like.

Figure 12F:
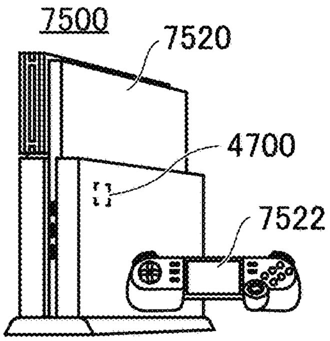

FIG. 12F illustrates a stationary game machine 7500 that is another example of a game machine. The stationary game machine 7500 includes a main body 7520 and a controller 7522. The controller 7522 can be connected to the main body 7520 with or without a wire. Although not illustrated in FIG. 12F, the controller 7522 can include a display portion that displays a game image, and an input interface besides a button, such as a touch panel, a stick, a rotating knob, and a sliding knob, for example. The shape of the controller 7522 is not limited to that illustrated in FIG. 12F, and can be changed variously in accordance with the genres of games. For example, in a shooting game such as an FPS (First Person Shooter) game, a gun-shaped controller having a trigger button can be used. As another example, in a music game or the like, a controller having a shape of a music instrument, audio equipment, or the like can be used. Furthermore, the stationary game machine may include a camera, a depth sensor, a microphone, and the like so that the game player can play a game using a gesture and/or a voice instead of a controller.

Videos displayed on the game machine can be output with a display device such as a television device, a personal computer display, a game display, and a head-mounted display.

As examples of game machines, the portable game machine and the home-use stationary game machine are illustrated in FIG. 12E and FIG. 12F. However, the electronic device of one embodiment of the present invention is not limited thereto. Examples of the electronic device of one embodiment of the present invention include an arcade game machine installed in an entertainment facility (e.g., a game center and an amusement park) and a throwing machine for batting practice, installed in sports facilities.

[Moving Vehicle]

The secondary battery described in the above embodiment can be used in an automobile, which is a moving vehicle, and around the driver's seat in an automobile.

Figure 12G:
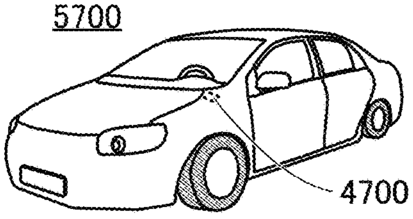

FIG. 12G illustrates an automobile 5700 that is an example of a moving vehicle.

An instrument panel that provides various kinds of information by displaying a speedometer, a tachometer, a mileage, a fuel meter, a gearshift state, air-conditioning settings, and the like is provided around the driver's seat in the automobile 5700. In addition, a display device showing the above information may be provided around the driver's seat. When part of the secondary battery of one embodiment of the present invention is used for the automobile 5700, the automobile 5700 can have high reliability.

In particular, the display device can compensate for the view obstructed by the pillar or the like, the blind areas for the driver's seat, and the like by displaying a video taken by an imaging device (not illustrated) provided for the automobile 5700, thereby providing a high level of safety. That is, displaying an image taken by the imaging device provided on the exterior of the automobile 5700 can compensate for blind areas and enhance safety.

Although an automobile is described above as an example of a moving vehicle, the moving vehicle is not limited to vehicles such as an automobile. Examples of a moving vehicle include a train, a monorail train, a ship, and a flying object (a helicopter, an unmanned aircraft (a drone), an airplane, and a rocket).

[Camera]

The secondary battery described in the above embodiment can be used in a camera.

Figure 12H:
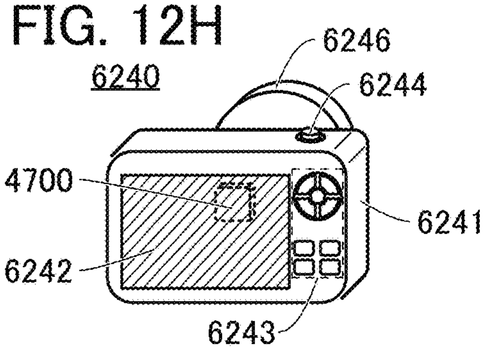

FIG. 12H illustrates a digital camera 6240 that is an example of an imaging device. The digital camera 6240 includes a housing 6241, a display portion 6242, operation switches 6243, a shutter button 6244, and the like, and an attachable lens 6246 is attached to the digital camera 6240. Here, the lens 6246 of the digital camera 6240 is detachable from the housing 6241 for replacement; alternatively, the lens 6246 may be incorporated into the housing 6241. Moreover, the digital camera 6240 may be configured to be equipped with a stroboscope, a viewfinder, or the like.

[Video Camera]

The secondary battery described in the above embodiment can be used in a video camera.

Figure 12I:
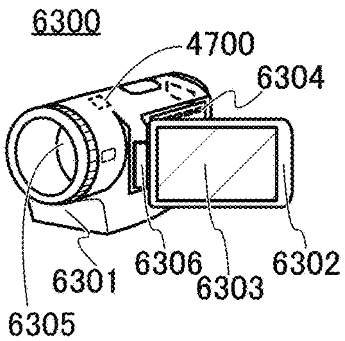

FIG. 12I illustrates a video camera 6300 that is an example of an imaging device. The video camera 6300 includes a first housing 6301, a second housing 6302, a display portion 6303, an operation switch 6304, a lens 6305, a joint 6306, and the like. The operation switch 6304 and the lens 6305 are provided for the first housing 6301, and the display portion 6303 is provided for the second housing 6302. The first housing 6301 and the second housing 6302 are connected to each other with the joint 6306, and the angle between the first housing 6301 and the second housing 6302 can be changed with the joint 6306. Videos displayed on the display portion 6303 may be switched in accordance with the angle at the joint 6306 between the first housing 6301 and the second housing 6302.

[ICD]

The secondary battery described in the above embodiment can be used in an implantable cardioverter-defibrillator (ICD).

Figure 12J:
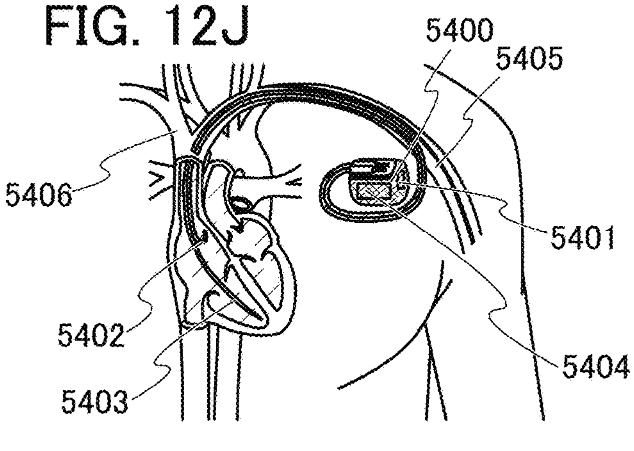

FIG. 12J is a schematic cross-sectional view illustrating an example of an ICD. An ICD main unit 5400 includes at least a secondary battery 5401, a regulator, a control circuit, an antenna 5404, a wire 5402 reaching a right atrium, and a wire 5403 reaching a right ventricle.

The ICD main unit 5400 is implanted in the body by surgery, and the two wires pass through a subclavian vein 5405 and a superior vena cava 5406 of the human body, with the end of one of the wires placed in the right ventricle and the end of the other wire placed in the right atrium.

The ICD main unit 5400 functions as a pacemaker and paces the heart when the heart rate is not within a predetermined range. When the heart rate is not recovered by pacing (e.g., when ventricular tachycardia or ventricular fibrillation occurs), treatment with an electrical shock is performed.

The ICD main unit 5400 needs to monitor the heart rate all the time in order to perform pacing and deliver electrical shocks as appropriate. For that reason, the ICD main unit 5400 includes a sensor for measuring the heart rate. In the ICD main unit 5400, data on the heart rate obtained by the sensor, the number of times the treatment with pacing is performed, and the time taken for the treatment, for example, can be stored in the electronic component 4700.

The antenna 5404 can receive electric power, and the electric power is charged into the secondary battery 5401. When the ICD main unit 5400 includes a plurality of secondary batteries, the safety can be improved. Specifically, even if one of the secondary batteries in the ICD main unit 5400 is dead, the other batteries can work properly; hence, the batteries also function as an auxiliary power supply.

In addition to the antenna 5404 that can receive electric power, an antenna that can transmit a physiological signal may be included to construct, for example, a system that monitors the cardiac activity and is capable of monitoring physiological signals such as pulses, respiratory rate, heart rate, and body temperature with an external monitoring device.

Figure 11:
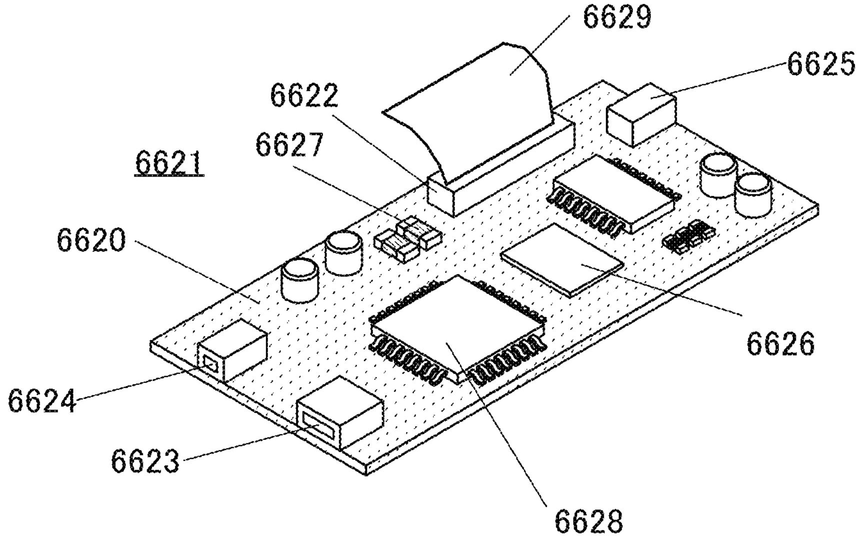
FIG. 11 illustrates an example of an electronic device showing one embodiment of the present invention.

A signal processing board 6621 illustrated in FIG. 11 is an example of a board corresponding to the electronic component 4700 illustrated in any one of FIG. 12A to FIG. 12I. A board support 6620 can also be referred to as a wiring board or a circuit board including a ceramic material, which is called a green sheet.

The signal processing board 6621 includes a connection terminal 6623, a connection terminal 6624, a connection terminal 6625, a semiconductor device 6626, a secondary battery 6627, a semiconductor device 6628, and a connection terminal 6622.

The semiconductor device 6626 includes a signal input/output terminal (not illustrated) which is electrically connected to the secondary battery 6627. The semiconductor device 6626 also serves as a charging and discharging control circuit of the secondary battery 6627, a protective circuit of the secondary battery 6627, and a power supply circuit that supplies power or signals from the secondary battery 6627 to other components. Although two secondary batteries 6627 are illustrated in FIG. 11, there is no particularly limitation on the number of the secondary batteries, and one secondary battery or three or more secondary batteries may be provided.

The connection terminal 6622 has a shape such that a connector of an FPC 6629 can be inserted thereto. The connection terminal 6622 serves as an interface for connecting a display module or another board.

The connection terminal 6623, the connection terminal 6624, and the connection terminal 6625 can serve, for example, as an interface for performing power supply, signal input, or the like to the signal processing board 6621. As another example, they can serve as an interface for outputting a signal calculated by the signal processing board 6621. Examples of the standard for each of the connection terminal 6623, the connection terminal 6624, and the connection terminal 6625 include USB (Universal Serial Bus), SATA (Serial ATA), and SCSI (Small Computer System Interface). In the case where video signals are output from the connection terminal 6623, the connection terminal 6624, and the connection terminal 6625, an example of the standard therefor is HDMI (registered trademark).

The semiconductor device 6628 includes a plurality of terminals. When the terminals are reflow-soldered, for example, to wirings of the board support 6620, the semiconductor device 6628 and the wirings of the board support 6620 can be electrically connected to each other. Examples of the semiconductor device 6628 include an FPGA (Field Programmable Gate Array), a GPU, and a CPU.

The secondary battery of one embodiment of the present invention is implemented in board supports of a variety of electronic devices described above, whereby a smaller size, higher speed, or lower power consumption of the electronic devices can be achieved. Furthermore, the secondary battery of one embodiment of the present invention which hardly deteriorates, whereby electronic devices with stable operation can be achieved. Thus, the reliability of the electronic devices can be improved.

This embodiment can be freely combined with the other embodiments.

REFERENCE NUMERALS

50*a*: positive electrode active material layer, 50*b*: solid electrolyte layer, 50*c*: negative electrode active material layer, 70*a*: package component, 70*b*: package component, 70*c*: package component, 71: external electrode, 72: external electrode, 73*a*: positive electrode current collector layer, 73*b*: negative electrode current collector layer, 74: buffer layer, 101: positive electrode active material layer, 200A: positive electrode active material, 200B: positive electrode active material, 400: secondary battery, 410: negative electrode, 411: negative electrode active material, 420: solid electrolyte layer, 421: solid electrolyte, 430: positive electrode, 431: positive electrode active material, 500: secondary battery, 600: secondary battery, 901: mixture, 902: mixture, 903: mixture, 4700: electronic component, 5200: portable game machine, 5201: housing, 5202: display portion, 5203: button, 5300: desktop information terminal, 5301: main body, 5302: display portion, 5303: keyboard, 5400: ICD main unit, 5401: secondary battery, 5402: wire, 5403: wire, 5404: antenna, 5405: subclavian vein, 5406: superior vena cava, 5500: information terminal, 5510: housing, 5511: display portion, 5700: automobile, 5800: electric refrigerator-freezer, 5801: housing, 5802: refrigerator door, 5803: freezer door, 5900: information terminal, 5901: housing, 5902: display portion, 5903: operation switch, 5904: operation switch, 5905: band, 6240: digital camera, 6241: housing, 6242: display portion, 6243: operation switch, 6244: shutter button, 6246: lens, 6300: video camera, 6301: housing, 6302: housing, 6303: display portion, 6304: operation switch, 6305: lens, 6306: joint, 6620: board support, 6621: signal processing board, 6622: connection terminal, 6623: connection terminal, 6624: connection terminal, 6625: connection terminal, 6626: semiconductor device, 6627: secondary battery, 6628: semiconductor device, 6629: FPC, 7500: stationary game machine, 7520: main body, 7522: controller

The invention claimed is:

1. A lithium-ion secondary battery-comprising:

a stacked body in which a positive electrode current collector layer that is an aggregate of first metal particles comprising aluminum, a positive electrode active material layer, a solid electrolyte layer, a negative electrode active material layer, and a negative electrode current collector layer that is an aggregate of second metal particles are stacked in this order, wherein the solid electrolyte layer is an aggregate of metal-containing particles, wherein the metal-containing particles are mixed in the positive electrode active material layer and the negative electrode active material layer, wherein a surface of each of the first metal particles comprising aluminum is coated with a $TiO_xN_y$ film, wherein x is larger than zero and less than 2, wherein y is larger than zero and less than 1, and wherein the positive electrode active material layer comprises lithium and a transition metal.

2. A portable information terminal comprising the lithium-ion secondary battery-according to claim 1.

3. A vehicle comprising the lithium-ion secondary battery according to claim 1.

4. A lithium-ion secondary battery comprising:

a stacked body in which a positive electrode current collector layer that is an aggregate of first metal particles comprising copper, a positive electrode active material layer, a solid electrolyte layer, a negative electrode active material layer, and a negative electrode current collector layer that is an aggregate of second metal particles are stacked in this order, wherein the solid electrolyte layer is an aggregate of metal-containing particles, wherein the metal-containing particles are mixed in the positive electrode active material layer and the negative electrode active material layer, wherein a surface of each of the first metal particles comprising copper is coated with a $TiO_xN_y$ film, wherein x is larger than zero and less than 2, wherein y is larger than zero and less than 1, and wherein the positive electrode active material layer comprises lithium and a transition metal.

5. A portable information terminal comprising the lithium-ion secondary battery-according to claim 4.

6. A vehicle comprising the lithium-ion secondary battery according to claim 4.

7. An implantable cardioverter-defibrillator comprising:

a sensor configured to measure heat rate;

the lithium-ion secondary battery according to claim 1; and an antenna configured to receive electric power, wherein the electric power is charged into the lithium-ion secondary battery.

* * * * *